Figure 1A:
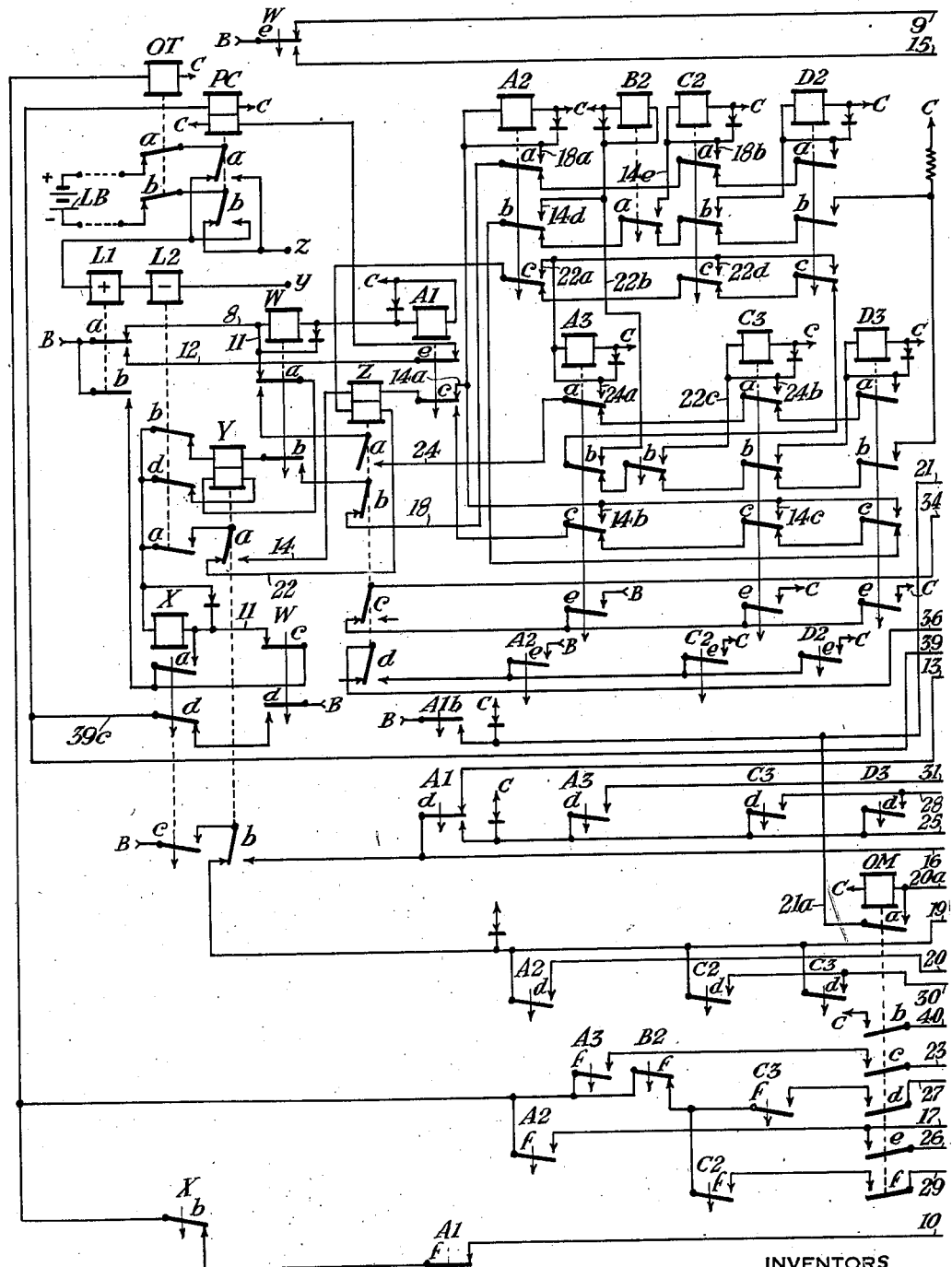

Aug. 4, 1942.  C. S. SNAVELY ET AL  2,292,245
REMOTE CONTROL SYSTEM
Filed Nov. 23, 1940          8 Sheets-Sheet 1

INVENTORS
Clarence S. Snavely
Alfred B. Miller and
BY Arthur P. Jackel
Their ATTORNEY Aug. 4, 1942.　　　C. S. SNAVELY ET AL　　　2,292,245
REMOTE CONTROL SYSTEM
Filed Nov. 23, 1940　　　8 Sheets-Sheet 7

INVENTORS
Clarence S. Snavely
Alfred B. Miller and
Arthur P. Jackel.
BY
Their ATTORNEY Aug. 4, 1942. C. S. SNAVELY ET AL 2,292,245
REMOTE CONTROL SYSTEM
Filed Nov. 23, 1940 8 Sheets-Sheet 8

INVENTORS
Clarence S. Snavely
Alfred B. Miller and
BY Arthur P. Jackel.
Their ATTORNEY Patented Aug. 4, 1942

2,292,245

UNITED STATES PATENT OFFICE 2,292,245

REMOTE CONTROL SYSTEM

Clarence S. Snavely, Churchill, Alfred B. Miller, Edgewood, and Arthur P. Jackel, Wilkinsburg, Pa., assignors to The Union Switch and Signal Company, Swissvale, Pa., a corporation of Pennsylvania Application November 23, 1940, Serial No. 366,874

26 Claims. (Cl. 246—3)

Our invention relates to remote control systems for the control from a central point of selected devices located at remote points, and for also indicating at the control point the condition of such devices and other devices at remote points. In its specific embodiment, our invention relates to centralized traffic control systems for railroads of the type in which a large number of railway signals and track switches at different stations along the track are controlled from time to time from a dispatcher's office over a single line circuit, and in which the same line circuit is also employed at other times to indicate the positions assumed by the switches and signals and also to indicate the presence of trains at the same or at other field stations.

Our invention comprises a code signaling system employing a single normally closed line circuit which is controlled by independently operable code transmitters located at the office and at each of a plurality of field stations. The apparatus is so arranged that the transmission of a code can be initiated only when the line is in its normal closed condition and energized by current of a given relative polarity. To transmit a code, the line is first opened and then a series of short and long impulses of current of the reverse polarity is transmitted, and finally, current of normal polarity is again supplied to the line to mark the end of a code. Thus in a series of codes, the successive impulses of each code are all of the reverse polarity but the codes are spaced by short impulses of normal polarity.

One object of our invention relates to the provision of a relatively simple and reliable all-relay code signaling system which is adapted to perform a large number of different operations with accuracy at a relatively high speed, and which provides the maximum flexibility and economy in its application to different installations, both from the standpoint of the physical layout of the territory controlled and the number and grouping of the controlled functions at the different stations.

Our invention is an improvement upon that disclosed in our prior Patent No. 2,183,155, granted December 12, 1939, and upon those disclosed in the copending applications, Serial No. 222,860, filed August 3, 1938, and Serial No. 223,287, filed August 5, 1938, by Snavely and Miller, for Remote control systems.

One feature of our invention resides in an improved organization of circuits in which a single relay checks the integrity of a plurality of circuits which govern the operations of the apparatus on the different steps to insure proper operation during each step of the code, and also during the intervals between steps. Another feature of our invention resides in improved arrangements for operating a series of stepping relays and for generating and selectively receiving long and short impulses constituting a code.

A further feature of our invention resides in an arrangement for equalizing the use of the line between the different stations by preventing any station from transmitting more than one code if another station has a code stored for transmission, which is an improvement upon the apparatus provided for a generally similar purpose in the systems of the Snavely and Miller applications above referred to.

Our apparatus also includes circuit arrangements for electrically interlocking the switch and signal levers at the control office, which is an improvement upon the corresponding arrangement of the above-mentioned patent.

A specific feature of our invention comprises means for preventing a signal which has been put to stop by a train from being cleared again inadvertently, as the result of the repetition of a control code under certain conditions.

Other objects and features of our invention will become apparent as the description proceeds.

We shall describe one form of apparatus embodying our invention, and two modifications thereof, and shall then point out the novel features thereof in claims.

Figure 1B:
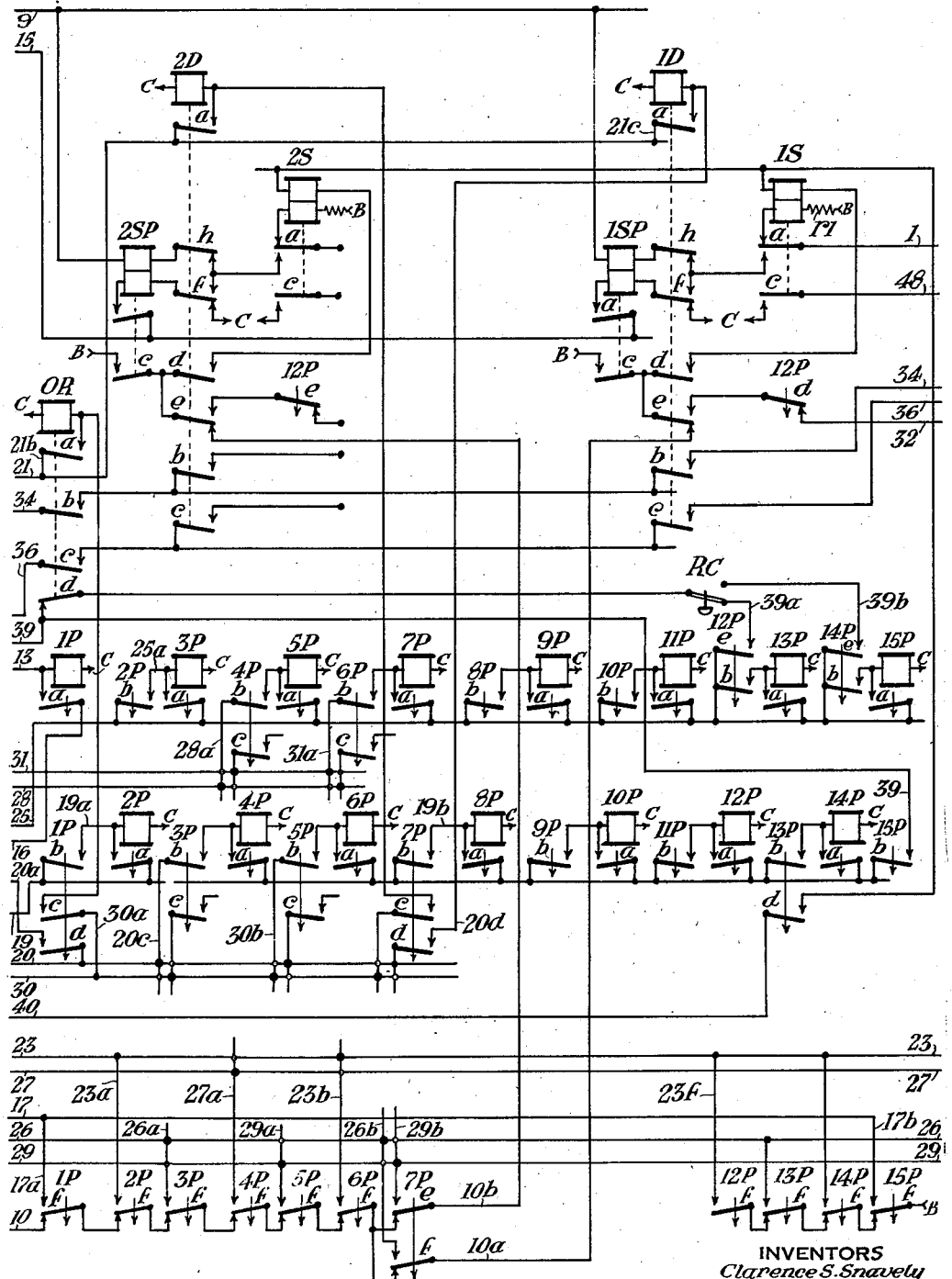
Figure 1C:
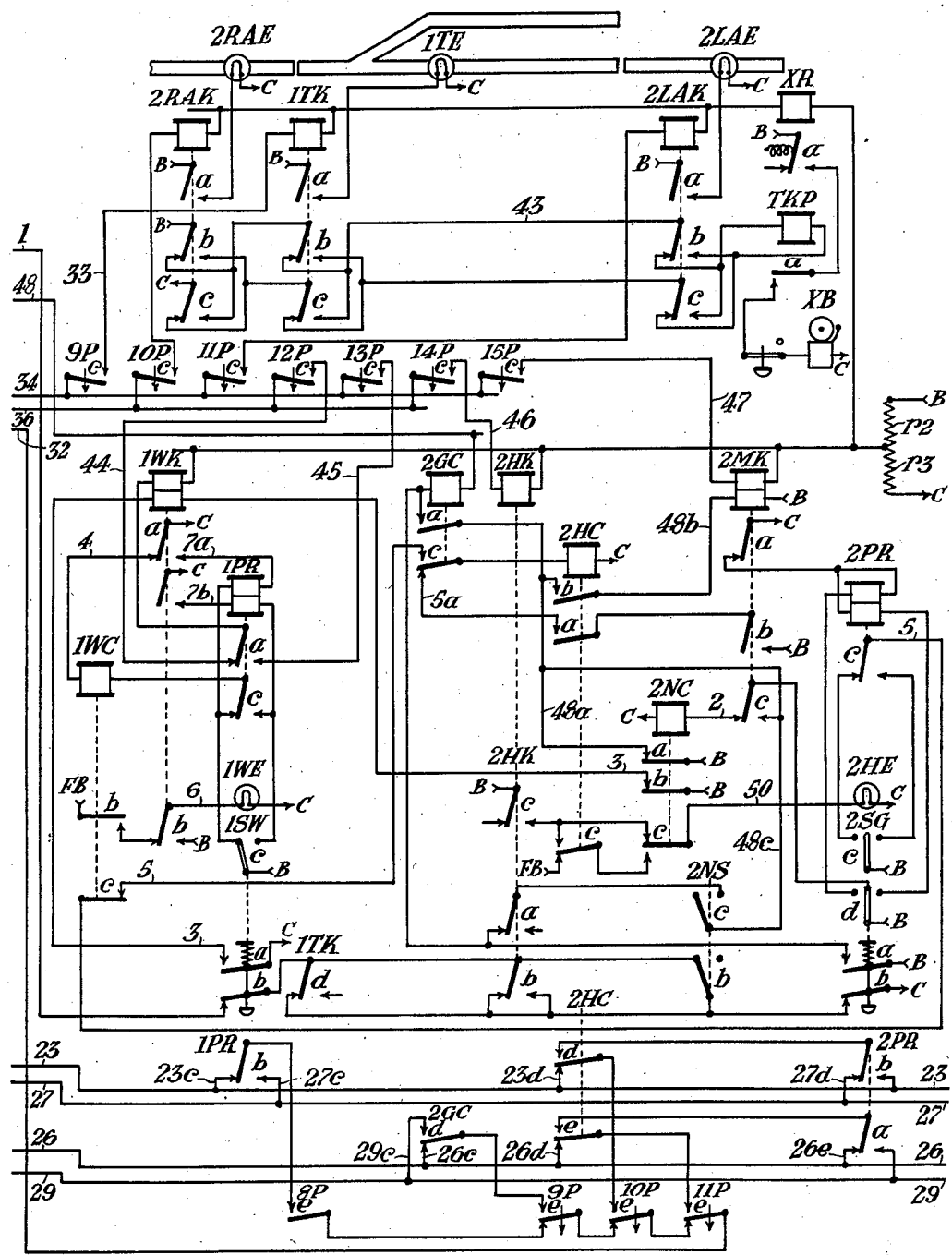
Figure 2A:
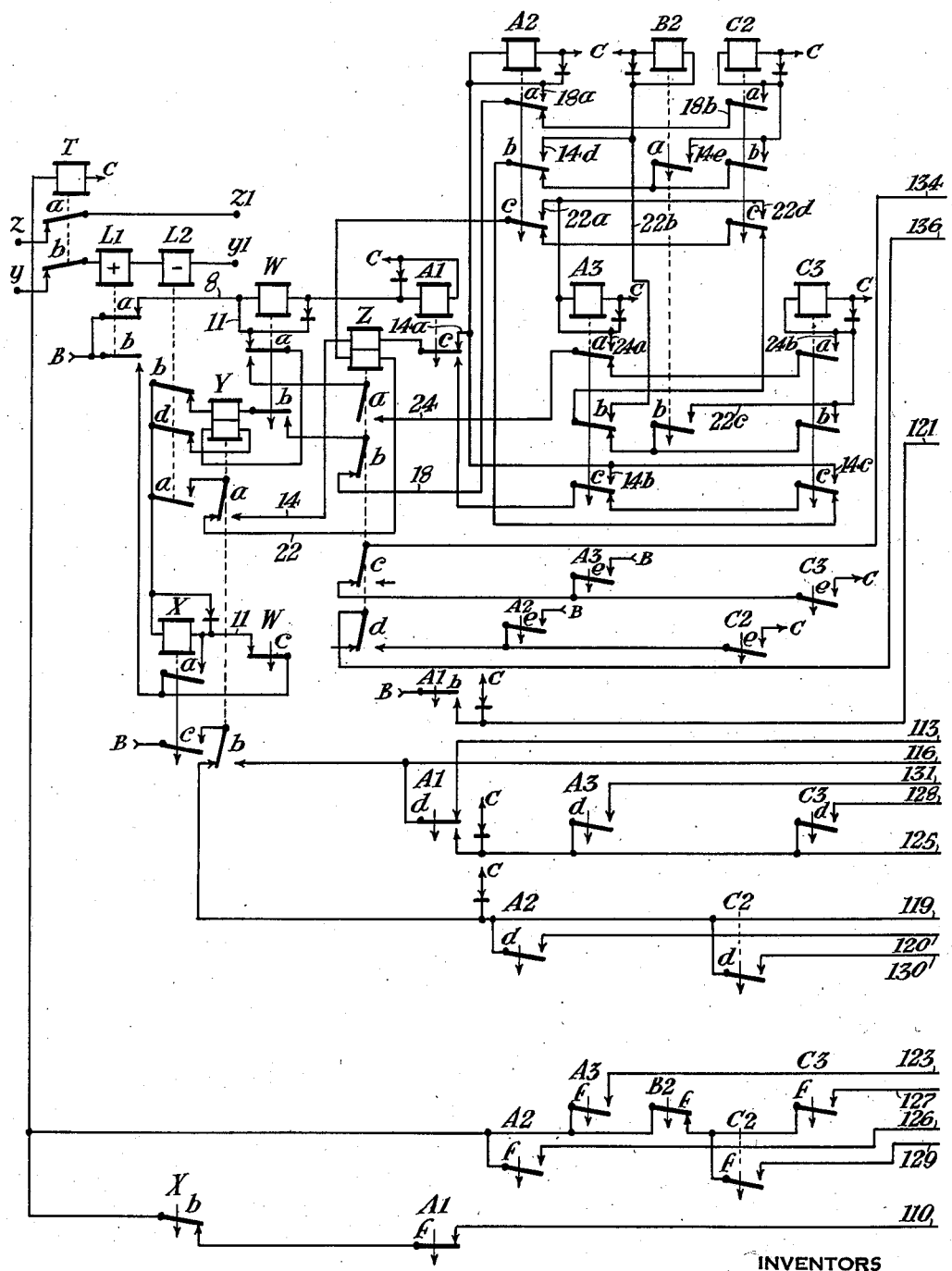
Figure 2B:
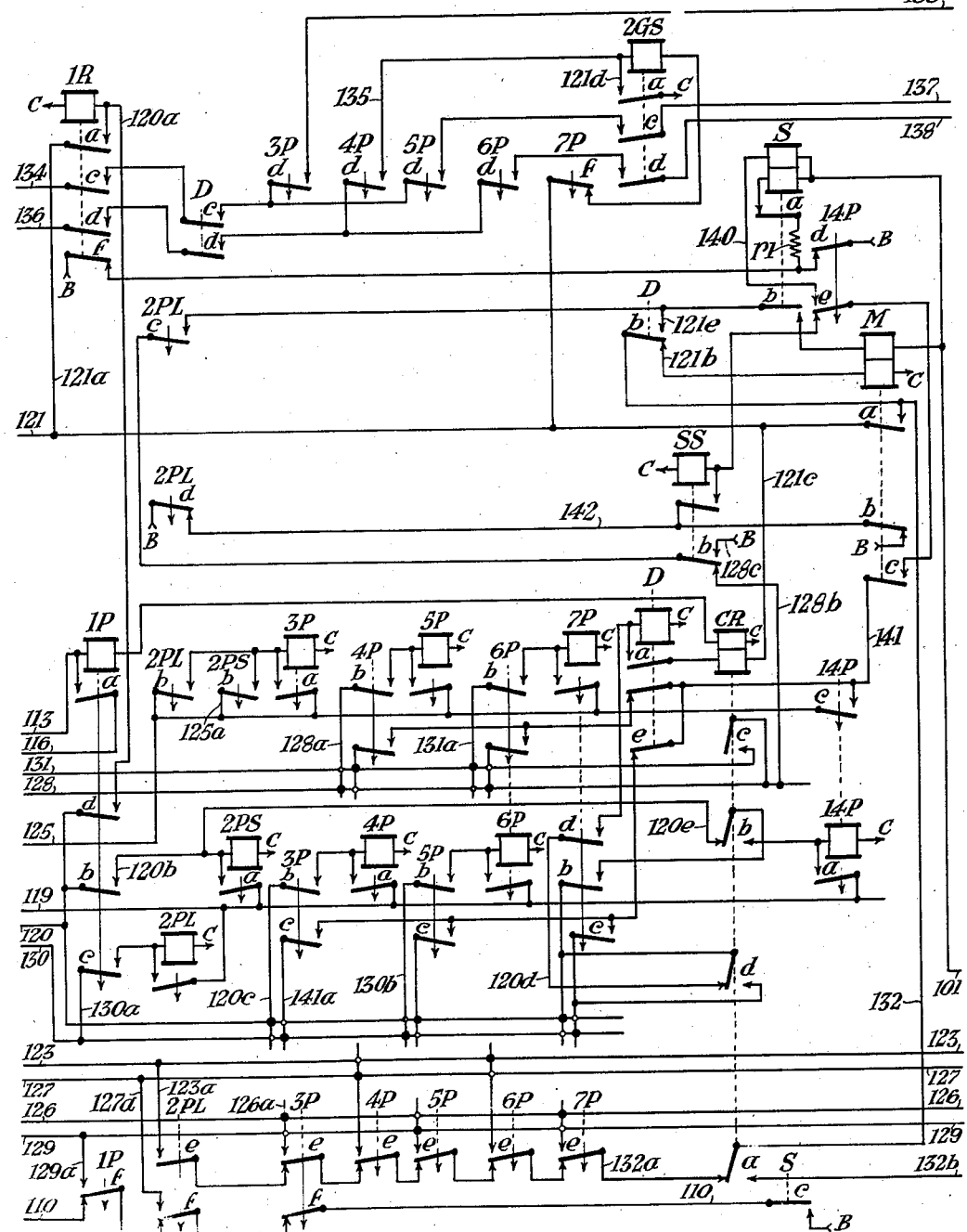
Figure 2C:
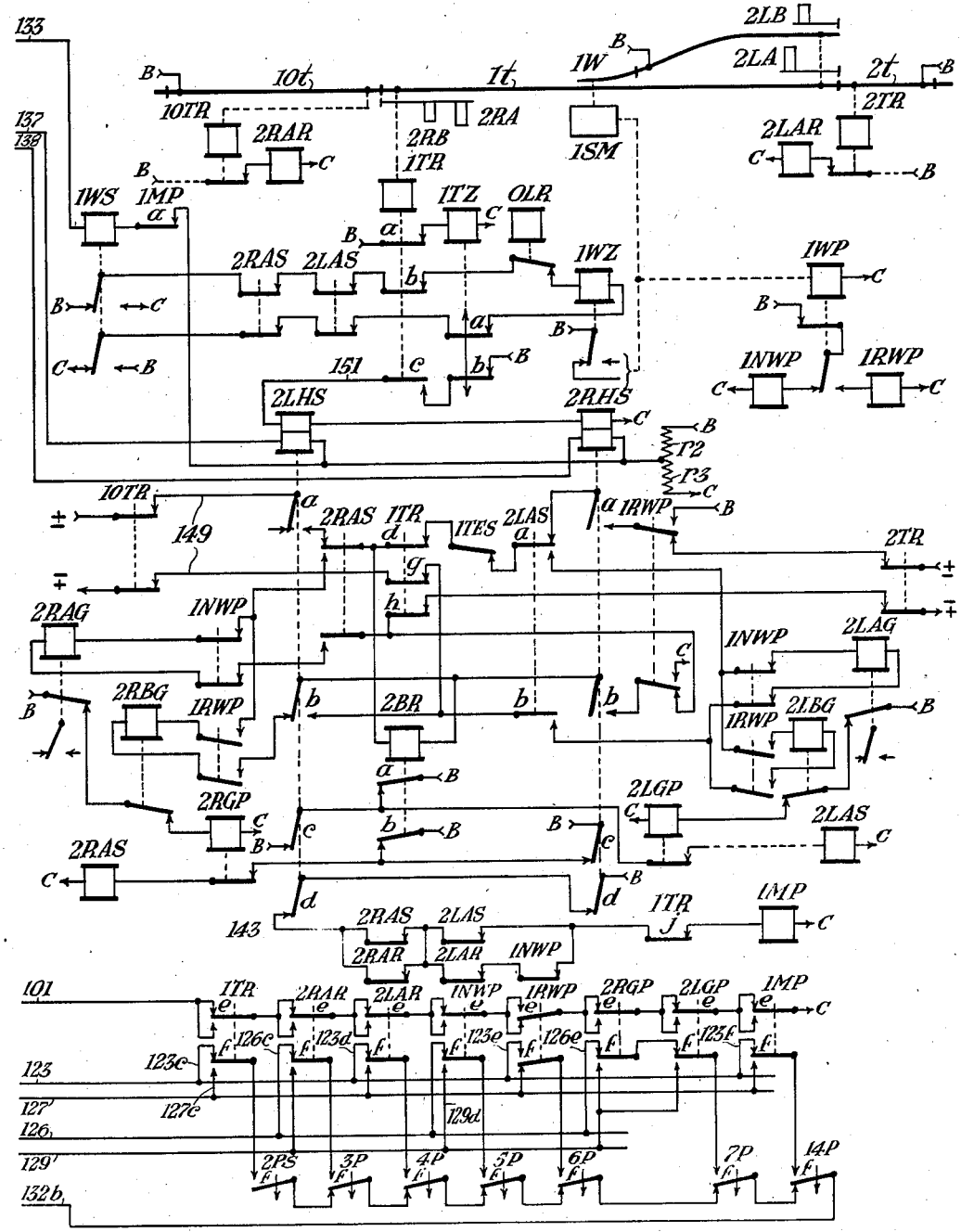
Figure 3A:
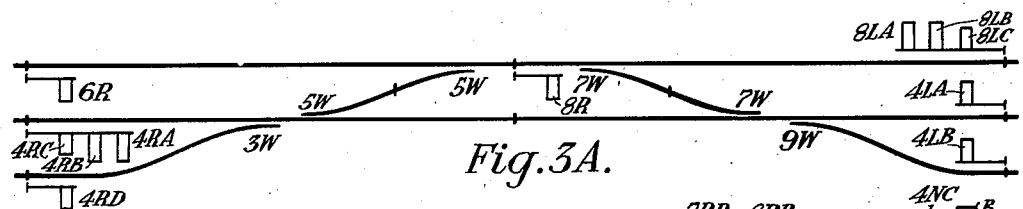
Figure 3B:
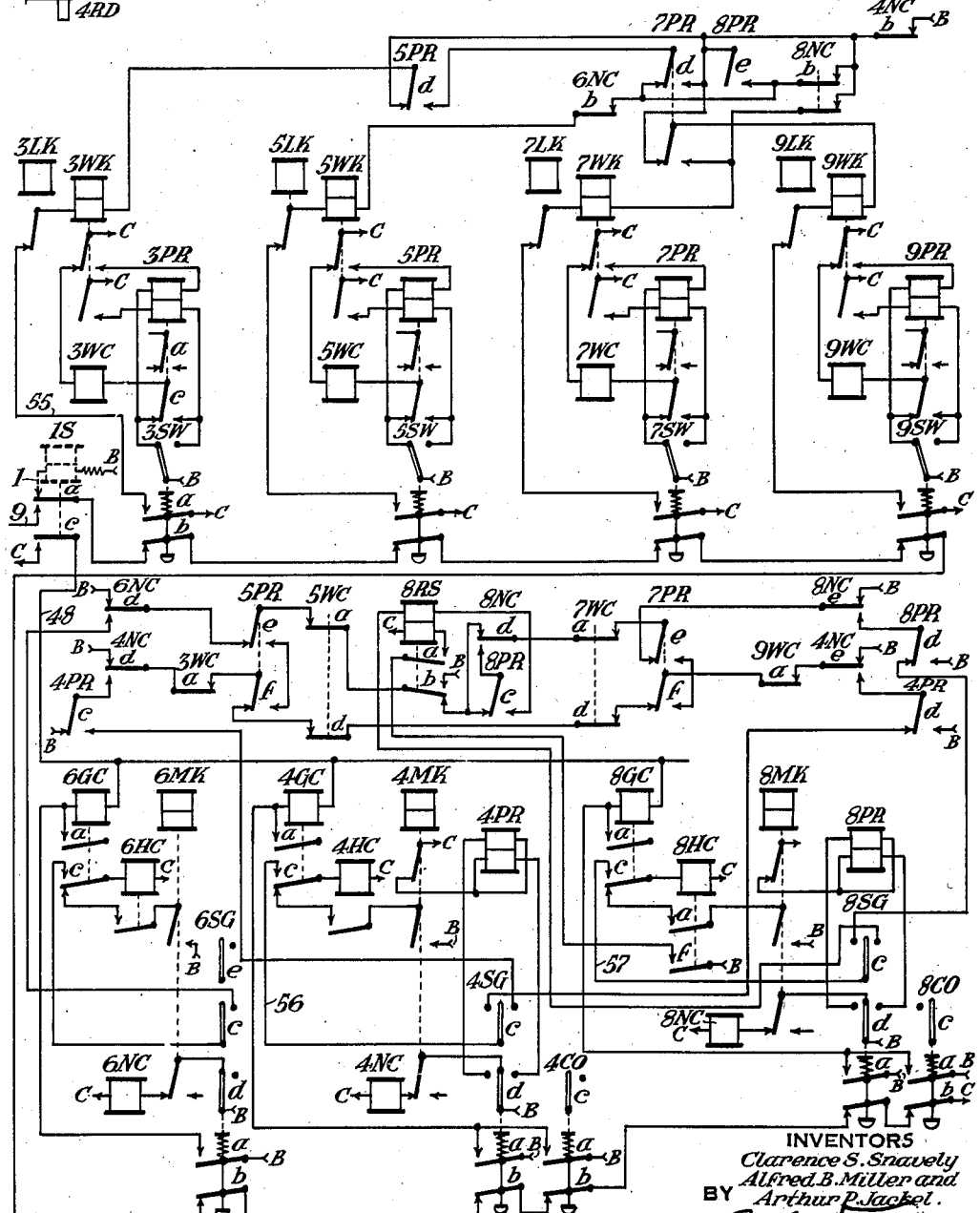
Figure 4:
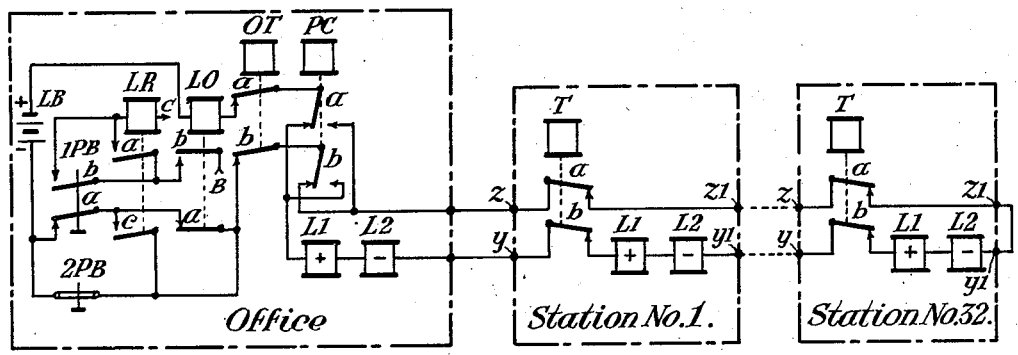
Figure 5B:
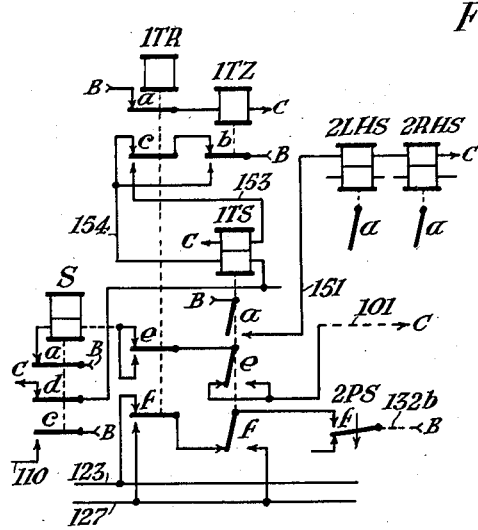
Figure 5A:
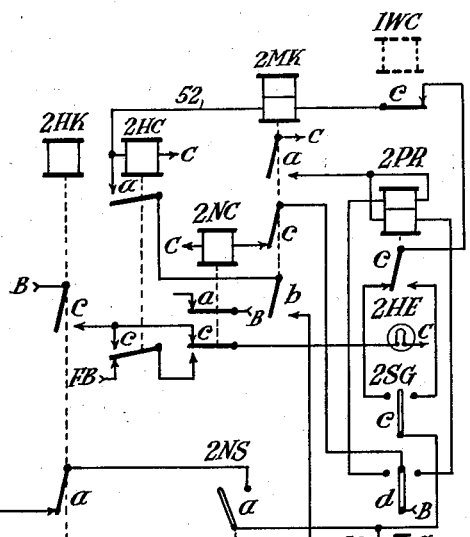
Figure 5A:
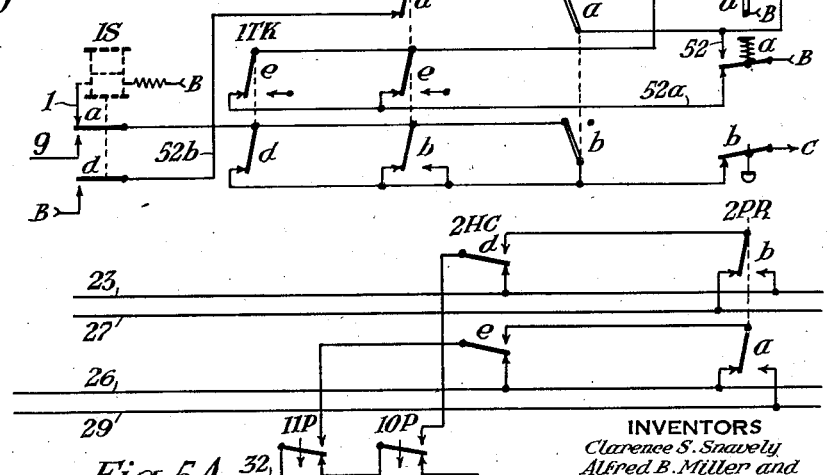

In the accompanying drawings, Figs. 1A, 1B, 1C, 2A, 2B and 2C, inclusive, form a diagrammatic view illustrating in condensed form one arrangement of apparatus employed in a centralized traffic control system embodying our invention. More particularly, Figs. 1A, 1B and 1C, taken together, comprise the dispatcher's office equipment for generating and delivering codes to the line circuit for transmission to one station, and for receiving codes from that station and operating the appropriate indication devices of the corresponding office panel. As hereinafter explained in detail, this apparatus may be readily expanded by duplicating certain portions so that it may be used to control and indicate apparatus at any desired number of different stations. When the codes include five station selecting steps, as herein illustrated, the maximum capacity of the system is thirty-two stations and the office equipment will include, as a maximum, thirty-two individual panels each generally similar to the one shown in Fig. 1C. Figs. 2A, 2B and 2C, taken together, comprise the equipment at one field station, as arranged for governing train movements over the track layout of Fig. 2C, which comprises one end of a passing siding on a single track railroad. In an installation of this character, it is to be understood that the coding equipment at all the stations is generally similar, while in other installations, more particularly those on a multiple track road, it will vary in the number of devices to be controlled and indicated from station to station. In any case, the different stations are distinguished by an appropriate arrangement of jumper connections, so that each is adapted to send and receive a particular code call characteristic of the station, and each code has the number of steps required by the devices at the corresponding station. Fig. 3A shows a track plan for a typical interlocking track layout on a multiple track layout, while Fig. 3B illustrates the special office circuits for controlling such a layout, comprising a modification of Fig. 1C. Fig. 4 shows the line circuit connecting the office and stations. Fig. 5A shows a modification of the circuits for the signal lever 2SG which may be used in place of the corresponding circuits of Fig. 1C. Fig. 5B shows a corresponding modification of the field stations circuits of Fig. 2C, for use in connection with the apparatus of Fig. 5A.

Similar reference characters refer to similar parts in the several views.

Before proceeding with a detailed description of the circuits, we shall briefly explain the general plan and organization of our apparatus.

In the specific embodiment of our invention herein illustrated, each control code consists of a series of twelve long and short impulses, all of the same polarity, while each indication code has fifteen such impulses, the impulses being spaced by uniformly short intervals of no current. The first impulse of each code is employed to select the direction of transmission, so as to give the office the preference in the use of the line in the event the office and one or more stations initiate codes at the same time. The first impulse is short in each control code initiated at the office, while the first impulse is long in each indication code initiated at a field station. The second impulse is employed to prevent any field station from sending more than one indication code if other stations have codes stored for transmission, in order to prevent undue delay in transmission from any station. The second impulse is long in any indication code transmitted by any station on its first attempt to transmit, and is short in all other indication codes, and is also short in each control code.

The next five impulses (steps three to seven, inclusive) provide thirty-two different combinations of short and long impulses for station selection in case of control codes, or for the selection of the office panel corresponding to the transmitting station in the case of indication codes. Following the station selecting elements a plurality of "function" impulses are transmitted for governing in turn each of a plurality of controlled devices. Each control code usually includes four function impulses and each indication code seven; the controlled device corresponding to each function impulse is operated in accordance with the long or short character of the impulse, during the line closed period constituting the next succeeding impulse. Each code includes an additional step during which the last function impulse is registered, this final step being the twelfth step in a control code and the fifteenth in an indication code, and is a short impulse in each case.

The apparatus at the office and stations is generally similar and with a few exceptions, which will be pointed out as the description proceeds, corresponding relays at the office and stations operate in unison on each step.

The line circuit, as shown in Fig. 4, includes in series the winding of a positively biased polar line relay L1, a negatively biased polar line relay L2, and back contacts $a$ and $b$ of a transmitter relay OT at the office and of a similar relay T at each station, and at the office it includes a line battery LB and the contacts $a$ and $b$ of a pole changer relay PC. The line circuit at the office also includes the winding of a neutral line relay LO and the closed contact of a key 2PB forming a part of a manual stepping device similar to that described in the prior application, Serial No. 223,287, hereinbefore referred to.

Each code is stored for transmission, upon the release of a normally energized starting relay 1S or S, (Figs. 1B and 2B) which initiates the code by energizing the associated transmitter relay OT or T to thereby open the line circuit.

Portions of the line circuit are also shown in Figs. 1A and 2A, and it will be clear from Fig. 4 that the portion of the line circuit shown in Fig. 1A, and a plurality of portions, one for each station, each similar to the portion shown in Fig. 2A, are connected by the line wires $y$ and $z$ to form a single closed circuit which is normally energized by current supplied by the office line battery. This current is normally of the proper polarity to cause the relays L1 to be picked up, while the relays L2 which operate only on current of the opposite polarity normally occupy their released positions, as shown. As soon as the line circuit is opened to initiate code transmission, relay PC is operated and the polarity is reversed; each relay L1 remains released for the duration of the code, and the relays L2 are operated repeatedly in unison in accordance with the code generated by the repeated opening and closing of the line circuit by relay OT, in case of a control code, or by one of the relays T, in the case of an indication code.

The pole-changer PC is restored to its normal position during the line-open interval following the last impulse of each code, so that the relays L1 are again energized and pick up and relays L2 are released when the line is restored to normal at the end of a code.

Each relay L1 controls a normally energized relay W and a timing relay A1, in series, which relays are deenergized for the duration of each code.

Each relay L2 controls two series of cascade-connected timing relays, A2, B2, C2, and A3, B2, C3, (relay B2 being common to both series), the relays of one series or the other being energized successively to generate and to register the long impulses of a code like the similarly designated relays of application Serial No. 223,287. The two series of relays are used alternately. Each timing relay A2 or A3 is picked up over a circuit which includes a winding of a polar relay Z of the magnetic stick type. Relay A2 is energized and relay Z operated to the left at the beginning of each odd-numbered step, while A3 is energized and relay Z operated to the right at the beginning of each even-numbered step. The timing relay which happens to be in its energized position when relay L2 releases at the end of an impulse is held energized over its stick circuit which includes a contact of relay Z and a winding of a polar relay Y of the magnetic stick type. Relay Y is operated to the left at the beginning of the line-open interval following each odd-numbered step, and to the right at the beginning of the interval following each even-numbered step. Relay Y controls the pick-up circuits for relays A2 and A3 to cause these relays to be operated alternately in response to the repeated operation of relay L2. Relay Z similarly controls the stick circuits for these relays so that a relay of the proper series will be held energized during each interval between impulses, and also controls the circuits by which the function elements operate the field stick relays 1WS, 2LHS, 2RHS, (Fig. 2C) or relays 1TK, 2RAK, etc., (Fig. 1C).

Each of the circuits including relay Y or Z also includes, in series, the winding and front contact $a$ of a checking relay X which relay is held energized for the duration of a code.

Relay X and the timing relays of one series or the other, selected by relay Y, control a series of stepping relays 1P, 2P, etc. Each relay P is energized upon the operation of relay Y during the interval preceding the corresponding step of the code, is held energized over a stick circuit during the corresponding step, and is released during the following interval after the next P relay picks up.

At the office, relays 1P to 12P, inclusive, Fig. 1B, are thus held energized on steps 1 to 12, respectively, of a control code, and relays 1P to 15P on steps 1 to 15 of an indication code. A station selector relay 1D or 2D is picked up in unison with relay 8P in accordance with the character of the seventh step to effect the control of the switch and signal control relays 1WS, 2LHS, etc., of Fig. 2C on succeeding steps in accordance with the positions of the switch and signal levers 1SW and 1SG, and associated relays of Fig. 1C in case of a control code, or to effect the control of the indication relays 1TK, 2RAK, etc., of the selected panel, in accordance with the positions of the station relays 1TR, 2RAR, etc., of Fig. 2C, in the case of an indication code.

At each station, as shown in Fig. 2B, there are two relays for the second step, either relay 2PL or 2PS being picked up according to the long or short character of the first step, and some of the stepping relays are operated through two cycles to reduce the number of relays required. At the selected station, relay 2PS is operated as the next in order after relay 7P, in unison with a selector relay D and the office relay 8P, and then a chain repeat relay CR, of the stick polar type, is reversed, upon the release of relay 7P. During the first cycle, the stations relays 3P to 7P are each operated in accordance with the character of the next preceding step, to select the desired station, but when relay CR reverses, the bus-wires by which the station selection is effected are connected together, so that during the second cycle, relays 3P to 7P are operated irrespective of code character, in unison with the office relays 9P to 13P, respectively, relay 14P being operated on the 14th step.

All of the groups of relays above mentioned are operated for both transmitting and receiving, differentiation between control and indication codes being effected by the energization of relays OM (Fig. 1A) and R (Fig. 2B) in unison with relays 2P and 2PS, in case of a control code, and by the energization of relay OR (Fig. 1B) and 2PL (Fig. 2B) in unison with relay 2P, followed by the energization of relay M (Fig. 2B), in case of an indication code.

Each control code is initiated by a code sending relay such as 1SP (Fig. 1B) which picks up upon the release of the corresponding starting relay 1S and completes a circuit 10 for the transmitter relay OT (Fig. 1A), at its front contact $c$. This circuit includes a front contact $f$ of relay A1, and hence is available only when the line is supplied with current of normal polarity.

Each indication code is initiated by closing a similar circuit 110 for relay T (Fig. 2A) which is completed upon the closing of back contact $c$ of the station starting relay S. During the code, each time relay OT or T picks up, the line is opened and the energization of a different stepping relay P results, which relay, in turn, opens the circuit for relay OT or T at a back contact $e$ or $f$, so that relay OT or T releases to close the line; the P relay then energized, at its front contact prepares another branch of the circuit for relay OT or T, which is completed, to terminate the impulse, upon the closing of a front contact of relay A2 or A3, in the case of a short step, or upon the closing of back contact $f$ of relay B2, in the case of a long step. In this manner, each transmitter relay is energized repeatedly and selectively to generate the different codes as required.

Referring now to Fig. 1C, one feature of our invention is the provision of arrangements for electrically interlocking the office control levers such as the switch lever 1SW and the signal lever 1SG, which is an improvement upon the generally similar arrangements shown in our prior patent hereinbefore referred to. Each switch lever is provided with a polar stick lever repeater such as the relay 1PR having a contact $b$ for determining the character of the switch control step of the code, a neutral control relay such as 1WC for controlling a route circuit governing the transmission of signal control codes, and a polar stick indication relay such as 1WK which is reversed upon a movement of the switch lever if conditions permit the transmission of a switch control code and restored to normal upon receipt of a code indicating that the corresponding track switch has assumed a position in accordance with such code.

Each signal lever such as lever 2SG is provided with two neutral control relays such as the relays 2HC and 2NC for selecting the clear and stop signal controls, respectively, a polar stick relay such as 2PR for selecting the left-hand or right-hand direction when the lever controls signals governing traffic in opposite directions, together with a signal indication relay such as 2HK which occupies its normal left-hand position as shown when the controlled signals are at stop and is reversed when any of these is cleared, and a lock indication relay 2MK controlled by the approach locking relays associated with the signals.

The object of these interlocking arrangements, as illustrated herein more fully in Fig. 3B, is to insure that a sequence of related codes for controlling the track switches of a route and for clearing the desired signal will be transmitted in the desired order. In the system of our prior patent, this was accomplished, in part, by the employment of an individual control code for each operated device, in lieu of a composite code capable of controlling a plurality of devices on successive steps, as employed in the system shown herein. In systems of the latter type, it is desirable, under certain circumstances, to avoid the repetition of a code for controlling a signal, that is, it is desirable to send a code for clearing a signal or for putting it to stop only in response to an operation of the corresponding lever. This is accomplished in a novel manner herein by the provision of an additional step in the code, controlled by a signal selecting relay such as 2GC, Fig. 1C, which is energized only when the corresponding signal lever 2SG is operated, and which controls a corresponding selecting relay 2GS, Fig. 2B, in the field. The arrangement is such that the signal control impulses corresponding to the position of lever 1SG although transmitted, as required for operation of the stepping relays P, are not delivered to the signal control relays 2LHS and 2RHS of Fig. 2C, unless the code is initiated as the result of the operation of lever 2SG.

The office control levers shown herein are of a novel type, combining the functions of a spring return starting push button and of a rotatable control lever in a single device. Each lever such as 1SW or 2SG, Fig. 1C, is normally locked in its last operated position by a spring actuated detent, and the lever must first be pushed, closing contact a and opening contact b, to disengage the detent. The lever may then be rotated to move its control contacts c and d to the desired position, and when released, becomes locked in that position by the action of the spring, which also effects the opening of contact a and the closing of contact b, the latter contact then completing a circuit for initiating a code containing a control element corresponding to the position of contact c.

Another feature of our apparatus resides in the provision of an auxiliary lever 2NS associated with lever 2SG, Fig. 1C. In normal operation, with lever 2NS in its left-hand position, the signal remains at stop after a train passes through section 1t because relays 2LHS and 2RHS, Fig. 2C, are restored to normal by the operation of the track relay 1TR and its repeater relay 1TZ. If a signal is cleared and lever 2NS operated to the right, a "signal clear" code will be transmitted automatically upon receipt of a code indicating that a train has caused the signal to assume the stop position, so that the signal will clear again for a following train.

A number of the relays employed in our apparatus are rendered slow release by the connection of asymmetric units of the copper oxide rectifier type in multiple with the relays, as shown conventionally for relay A1 or A2, Fig. 1A, for example. These units present a high resistance to the flow of current from the power source while providing a low resistance discharge path to permit the gradual discharge of the stored inductive energy of the relay when the power source becomes disconnected. The stepping relays P and the relays W and X are in this manner arranged to have sufficient retardation to hold them picked up in each case until other relays have picked up, while the timing relays A1, A2, etc. are arranged to have a definite constant time period which is preferably the same for all of these relays and which is so chosen as to provide the proper rate of operation and to so measure the relative lengths of the different impulses as to insure a wide margin against incorrect operation.

While any suitable relays may be used, the code relays shown herein are preferably of the types shown in the Snavely Patents Nos. 2,140,-604, issued December 20, 1938, and 2,178,289, issued October 31, 1939, for Electrical relays.

Referring now to Fig. 2C, the track diagram at the top represents a stretch of railway track including a track switch 1W and a group of signals 2R and 2L for governing traffic movements over the switch, corresponding to one end of a passing siding on a single track railway. The circuits of Fig. 2C represent one arrangement of interlocked switch and signal control apparatus which the polar stick relays 1WS, 2LHS and 2RHS of our station equipment are adapted to control. As indicated in Fig. 2C, the code-responsive relay 1WS governs a switch control relay 1WZ which in turn controls the switch machine 1SM so as to operate the track switch 1W to a position to correspond with that of contact a of relay 1WZ, when conditions are proper. The switch machine 1SM controls a switch indication relay 1WP which indicates the position and locked condition of switch 1W, and relay 1WP controls the normal and reverse indication repeating relays 1NWP and 1RWP, the contacts e and f of which govern the transmission of switch indication codes as hereinafter described, for controlling relay 1WK, Fig. 1C.

The signal shown in Fig. 2C are assumed to be of the well-known light signal type and each is controlled by a signal relay G over a circuit controlled by the code controlled relays 2LHS and 2RHS. When all the signals for one direction are at stop, the corresponding signal indication relay LGP or RGP is energized. Each relay GP at its contacts e and f governs the transmission of signal indication codes as hereinafter described for controlling relay 2HK, Fig. 1C, and at its contact c controls an approach locking stick relay LAS or RAS. The detailed circuits for relays LAS and RAS have been omitted, to simplify the drawings, but these may be arranged, for example, as shown for similarly designated relays in the Young Patent No. 2,141,074, granted December 20, 1938. The approach locking relays together with the track relay 1TR for the switch section 1t control the circuit for relay 1WZ and also control a switch locking repeater relay 1MP. Relay 1MP at its contact a controls the circuit for the code controlled relay 1WS and at its contacts e and f governs the transmission of codes for controlling relay 1MK, Fig. 1C.

Contacts e and f of the track relay 1TR and of the approach relays LAR and RAR, Fig. 2C, govern the transmission of track indication codes for the control of the corresponding relays 1TK 2RAK and 2LAK, respectively, Fig. 1C, to indicate the condition of the detector track section 1t and of the adjacent approach sections.

The signal circuits, as shown in Fig. 2C, are so arranged that a signal can be cleared only after the corresponding approach locking relay 2RAS or 2LAS is released, the latter relays being released in response to the operation of the corresponding code controlled relay 2RHS or 2LHS, in a manner similar to that described in the Allen et al. Patent No. 2,117,691, granted May 17, 1938. The arrangement shown herein includes an improvement over Allen et al. comprising the addition of a block relay 2BR, which is controlled over the signal line circuits and which prevents the release of the approach locking relay by the code-controlled relay if an attempt is made to clear a signal for an unavailable route.

The transmission of a typical control code will now be described in detail. It will be assumed that the apparatus is in the condition shown in the drawings, and that the code is initiated by a movement of the switch lever 1SW, Fig. 1C, which controls the track switch 1W, from normal to reverse, and that the corresponding five step station code call comprises a short impulse followed by two long impulses, followed in turn by two short impulses.

The starting relay 1S, Fig. 1B, for the individual panel of Fig. 1C is normally held energized over a circuit No. 1 which may be traced from one terminal B of a suitable source of current, resistor $r1$, the lower winding and contact $a$ of relay 1S, thence in Fig. 1C over the normally closed contact $b$ of each lever of the corresponding panel to the other terminal C of the source.

Referring now to Fig. 1C, when the switch lever 1SW is first pressed, its contact $b$ opens circuit 1, releasing relay 1S. If conditions in the field are proper for the operation of switch 1W, a code indication will have been received to operate relay 2MK to the left, as shown, and if the signal lever 2SG is in its stop position a circuit 2 is closed from terminal B at its contact $d$ over the left-hand contact $c$ of relay 2MK through relay 2NC to terminal C, so that relay 2NC is energized, as shown. Under these conditions the initial operation of lever 1SW completes a circuit 3 for the stick polar switch correspondence relay 1WK from terminal B, contact $b$ of relay 2NC, the lower winding of relay 1WK and contact $a$ of lever 1SW to terminal C. Relay 1WK is operated to the right over circuit 3, and its left-hand contact $a$ opens a circuit 4 for relay 1WC extending to terminal B over the left-hand contacts $c$ of relay 1PR and lever 1SW. Relay 1WC releases and opens its contact $c$ in a pick-up circuit 5 for relay 2HC, thereby rendering lever 2SG ineffective to transmit a signal clear code. The right-hand contact $b$ of relay 1WK completes a circuit 6 for the switch indication lamp 1WE which now becomes lighted, and completes connections to terminal C for circuits 7a and 7b for relay 1PR extending to terminal B at contact $c$ of lever 1SW, relay 1PR becoming energized over circuit 7a in the normal direction to corerspond with the position of lever 1SW.

Lever 1SW is now turned to the right from normal to reverse, relay 1PR becoming energized in the reverse direction over circuit 7b and closing its right-hand contacts. Relay 1PR controls the character of the eighth step of the code in accordance with the position of its contact $b$, and its contact $a$ prepares a circuit for restoring relay 1WK to its left-hand position upon receipt of an indication code indicating that the track switch controlled by lever 1SW has assumed a position corresponding to that of relay 1PR. Lamp 1WE remains lighted until this occurs.

In the event lever 1SW is operated when relay 2NC is not energized, relays 1WK and 1PR will fail to respond, but relay 1WC will be released upon movement of the lever out of correspondence with relay 1PR, in which case circuit 6 will be energized from a source of interrupted current FB to cause lamp 1WE to display a flashing indication, warning the operator that a code for operating the switch cannot be issued.

Assuming lamp 1WE to be lighted steadily, lever 1SW is released in the reverse position, opening contact $a$ and closing contact $b$, contact $c$ becoming locked reversed.

Relays W and A1, Fig. 1A, are normally energized over a circuit 8 extending from terminal B over front contact $a$ of relay L1 through the windings of relays W and A1 in series to terminal C. The closing of contact $b$ of lever 1SW therefore completes a circuit 9 from terminal B, front contact $e$ of relay W, the upper winding of relay 1SP, Fig. 1B, back contact $h$ of relay 1D, back contact $a$ of relay 1S, and thence over circuit 1 already traced to terminal C.

Relay 1SP picks up over circuit 9 and at its contact $c$ completes a branch 10a of an initial energizing circuit 10 for the transmitter relay OT, Fig. 1A, extending from terminal B over contact $c$ of relay 1SP, back contact $e$ of relay 1D, back contacts $f$ of relays 7P, 6P, 5P, 4P, 3P, 2P and 1P, front contact $f$ of relay A1, back contact $b$ of relay X, through the winding of relay OT to terminal C.

Relay OT picks up over circuit 10 to initiate the code, opening the line circuit at its contacts $a$ and $b$ and thereby releasing the line relay L1 at the office and at each station.

Relay LO, Fig. 4, controlling the manual stepping apparatus, is also released, but this relay performs no useful function during normal operation.

Each line relay L1, upon releasing, opens the pick-up circuit 8 and closes a stick circuit 11 for relays W and A1 extending from terminal B at back contact $b$ of relay L1, contact $c$ of relay W, the winding of relay X, contact $d$ of relay L2, the lower winding of relay Y, front contact $a$ and winding of relay W and the winding of relay A1 to terminal C.

Circuits 11 constitute pick-up circuits for relays X which now pick up, and each relay Y is operated to the right over circuit 11.

The office relay L1 also closes a circuit 12 from terminal B at its back contact $a$ which extends over contact $e$ of relay A1 through the lower winding of the stick polar relay PC, which relay becomes energized to operate its pole-changer contacts $a$ and $b$ to the right, in which position they remain until relay PC is restored to normal at the end of the code.

At the office, Fig. 1A, relay X completes a pick-up circuit 13 for relay 1P of Fig. 1B, extending from terminal B at contact $c$ of relay X over the right-hand contact $b$ of relay Y, front contact $d$ of relay A1 through the winding of relay 1P to terminal C. Contact $b$ of the office relay X opens circuit 10, deenergizing relay OT which then releases to close the line to begin the first code impulse. Each station relay X, Fig. 2A, completes a circuit 113 for the station relay 1P, Fig. 2B, which is similar to circuit 13 except that it extends to terminal C through the upper winding of a polar stick chain repeat relay CR which is thereby energized in its normal direction, as shown. Relay 1P at the office and at each station therefore pick up in unison.

Since relay PC is reversed, the line relays L2 at the office and at each station pick up in unison in response to the closing of the line circuit by relay OT; and each completes a pick-up circuit 14a for relay A2, which is one of a plurality of branches of a circuit 14 for relays X and Z extending from terminal B at contact $b$ of relay L1, front contact $a$ and winding of relay X, contact $a$ of relay L2, right-hand contact $a$ of relay Y, the upper winding of relay Z, front contact $c$ of relay A1, the winding of relay A2 to terminal C. Circuit 14 is a stick circuit for relay X, which is therefore held energized; and the closing of the branch 14a picks up relay A2 and also operates relay Z to close its left-hand contacts as shown if they are not already in that position.

Each circuit 11 is now open, and relays W and A1 release to remain deenergized for the remainder of the code, the office relay W completing a stick circuit 15 from terminal B at its back contact e, contact a and the lower winding of relay 1SP, back contact f of relay 1D to terminal C, over which relay 1SP is held energized independently of the condition of circuit 1 so that the code in progress cannot be interfered with by lever operation. Relays A1, upon releasing, open the pick-up circuit 13 for relay 1P at the office and the similar circuit 113 for relay 1P at each station at their front contacts d, but relays 1P are held energized over the stick circuits 16 and 116, as shown on the drawings.

When the office relay A2 picks up, its contact f completes a branch 17a of a circuit 17 over which relay OT is controlled to generate the short odd-numbered impulses. Circuit 17a extends from terminal B at contact c of relay 1SP over the same path as for circuit 16a to back contact f of relay 2P, thence over front contacts f of relays 1P and A2, relay OT to terminal C. Relay OT therefore picks up and opens the line circuit to terminate the first impulse as soon as relay A2 picks up, releasing the line relays L2.

Each relay L2 upon releasing closes a stick circuit 18a for relay A2, comprising a branch of a circuit 18 for relays X and Y, which may be traced from terminal B, back contact b of relay L1, contact a and winding of relay X, contact b of relay L2, the upper winding of relay Y, back contact b of relay W, left-hand contact b of relay Z, front contact a and winding of relay A2 to terminal C. Relay X is held energized and relay Y operated to the left over circuit 18 and the office relay Y completes a circuit 19a to pick up relay 2P extending from terminal B at contact c of relay X over left-hand contact b of relay Y, contact b of relay 1P through relay 2P to terminal C, circuit 19a being a branch of a stick circuit 19 for the even-numbered relays P. At the same time, relay OM is picked up over a circuit 20a which is a branch of a circuit 20 closed only at the end of a short odd-numbered impulse, circuit 20a being similar to circuit 19a except that it includes front contacts d of relays A2 and 1P. At each station, relay 1R, Fig. 2B, is picked up over a circuit 120a similar to circuit 20a, and relay 2PS is picked up over a circuit 120b which is also similar to circuit 20a except that it includes front contact b of relay 1P. Relay 2P it will be seen, is picked up independently of code character, but the energization of relays OM, 1R and 2PS is effected only in response to a short first impulse characteristic of a control code. Relay 2PS is held energized over a stick circuit 119 controlled by the left-hand contact b of relay Y and similar to circuit 19, but relays OM and 1R are held energized until the code is completed over branches 21a and 121a, respectively, of holding circuits 21 and 121 extending to terminal B at back contacts b of the associated relays A1.

The opening of right-hand contacts b of relays Y interrupt the stick circuits 16 and 116 for the relays 1P and these relays release.

The office relay 2P, upon picking up, opens circuit 17a, releasing relay OT which then closes the line circuit to begin the second impulse.

Relays L2 now pick up again in unison, and each completes a pick-up circuit 22a for relay A3, comprising a branch of a circuit 22 for relays X and Z which extends from terminal B at contact b of relay L1, over contact a and winding of relay X, contact a of relay L2, left-hand contact a of relay Y, lower winding of relay Z, front contact c of relay A2, relay A3 to terminal C. Each relay X is held energized, and each relay Z operated to the right over circuit 22. Each relay A3 picks up, and the office relay A3 at its contact f completes a branch 23a of a circuit 23 over which relay OT is controlled by relay A3 to make the second step short. Circuit 23a comprises a connection from terminal B over circuit 19a and front contact f of relay 2P to circuit 23 extending to terminal C through relay OT over front contact c of relay OM and front contact f of relay A3. Relay OT becoming energized over circuit 23a, opens the line circuit to terminate the second impulse, releasing the line relays L2.

Each relay L2, upon releasing, closes a holding circuit 24a for the associated relay A3, circuit 24a being a branch of a circuit 24 for relays X and Y, which may be traced from terminal B at back contact b of relay L1, contact a and winding of relay X, contact d of relay L2, lower winding of relay Y, back contact a of relay W, right-hand contact a of relay Z, front contact a of relay A3 to terminal C. Relays X are held energized, and relays Y operated to the right over circuits 24, and the office relay Y completes a circuit 25a to pick up relay 3P, extending from terminal B at contact c of relay X over right-hand contact b of relay Y, back contact d of relay A1, contact b of relay 2P, through relay 3P to terminal C. Circuit 25a is a branch of a stick circuit 25 for relay 3P and the remaining odd-numbered P relays. At each station, relay Y completes a similar pick-up circuit 125a for relay 3P which includes a front contact b of relay 2PS, circuit 125a being a branch of a stick circuit 125 for relays 3P, 5P and 7P. Relays Y also open the stick circuit 19 and 119 for relays 2P and 2PS and these relays release.

The office relay 3P, upon picking up, opens circuit 23a, releasing relay OT which then closes the line circuit to begin the third impulse.

It is to be understood that when an installation includes the full complement of 32 stations, there will be two relays 4P at the office, controlled over contacts b and c of relay 3P, two relays 5P for each relay 4P, two relays 6P for each relay 5P, and two series of relays 7P to 15P for each relay 6P; that is, there will be sixteen such series, each relay 7P controlling selector relays 1D and 2D for two stations. Furthermore, the number of relays in each series may be varied as required, according to the number of devices to be controlled.

The apparatus of Fig. 2B may also be varied at different stations according to the number of devices to be controlled. A single delivery relay D is employed for the control of a group of apparatus such as is shown in Fig. 2C, another relay D may be added if the apparatus is equivalent to two such groups; two relays 7P and four relays D may be used for a larger layout, and so on. On the drawings, these variations in the connections for the windings of the relays P and of their contacts e and f are indicated by small circles at certain wire intersections. It is to be understood that a black circle such as that connecting circuits 20 and 20c, Fig. 1B, or the one connecting circuits 120 and 120c, Fig. 2B, represents a closed connection, and that the adjacent white circle represents an open connection which may be used either in place of the closed connection or in addition thereto.

Each stepping relay at the transmitting point, controls the length of the code step of corresponding number, relays 3P to 7P, inclusive, generating the station code call. Each step of the code begins when the transmitter relay is released due to the opening of back contact $e$ or $f$ of the corresponding numbered relay P, and terminates when it is picked up over a circuit closed by a timing relay but including a front contact of the same relay P. Each step is short or long, depending upon whether the transmitter relay picks up over contact $f$ of relay A2 or C2, the case of an odd-numbered step, or over a contact $f$ of relay A3 or C3, in the case of an even-numbered step. In the case of the short steps, relay T is energized as soon as relay A2 or A3 picks up at the beginning of the step, but to produce long steps of suitable length, the energization of relay T is delayed by including in its circuit the back contact $f$ of relay B2. In the code being described, the third step is short because relay OT picks up over a circuit 26a comprising a connection from terminal B over circuit 10a to circuit 26 and thence through relay OT to terminal C. To select a station having a code call in which the third step is long, a connection would be provided from terminal B at the contact $c$ of another code sending relay such as relay 2SP over circuit 10b and the front contact $f$ of relay 3P to circuit 29. In this case, relay 4P, which is selectively controlled in accordance with the length of the third step, would be energized over circuit 39 in place of circuit 20.

When each relay L2 picks up at the beginning of the third step in the code being described, the holding circuit 24a for each relay A3 is opened, but before relay A3 releases the branch 14b of circuit 14 is closed to energize relays A2, Z and X. The closing of circuit 14 completes a cycle of operation of the relays X and Y which is repeated, with slight variations on the long steps, until the end of the code, circuits 14, 18, 22 and 24 being closed successively and repeatedly. Each of these circuits constitutes a stick circuit for relay X which thus remains picked up until the end of the code and checks the integrity of these circuits.

When the office relay A2 becomes energized as just described, its contact $f$ completes the circuit 26a for relay OT, which relay then picks up to terminate the third impulse, opening the line circuit and releasing the relays L2.

Each relay L2 upon releasing closes circuit 18a to hold relay A2 energized and to operate relay Y to the left, and relays Y close circuits 20c and 120c to pick up relays 4P at the office and at each station for which the code call includes a short third step. Relay Y also opens the holding circuits 25 and 125 for relays 3P at the office and at all stations, no further progression of the P relays occurring at those stations at which a P relay does not pick up at the end of a code step.

At the office, contact $f$ of relay 4P opens circuit 26a, releasing relay OT to close the line to begin the fourth step, and also prepares a circuit 27a comprising a connection from terminal B over circuit 10a and front contact $f$ of relay 4P to circuit 27 over which relay OT is controlled to make the fourth step long. Circuit 27 extends through relay OT to terminal C over contact $d$ of relay OM, front contact $f$ of relay C3 and back contact $f$ of relay B2.

Relays L2 now pick up, and each opens circuit 18a and closes circuit 22a, so that each relay A3 picks up and each relay Z is operated to the right. Each relay A2 is deenergized, and upon releasing, its front contact $c$ opens circuit 22a, deenergizing relay A3, and another branch 22b of circuit 22 extending over back contacts $c$ of relays A2, C2 and D2, front contact $b$ of relay A3 and the winding of relay B2 to terminal C is closed to pick up relay B2.

Each relay A3 then releases, and its contact $b$ opens branch 22b, deenergizing relay B2, and closes branch 22c including front contact $b$ of relay B2 to pick up relay C3. Each relay B2 then releases and the office relay B2 at its back contact $f$ completes circuit 27a for relay OT, which picks up to open the line circuit to terminate the fourth impulse.

Each line relay L2 now releases, and since the relays C3 are now picked up, each relay L2 completes a branch 24b of circuit 24 to hold the associated relay C3 energized. Each relay Y is operated to the right over circuit 24. The office relay 5P is energized over a branch 28a of circuit 28 including front contact $d$ of relay C3 and contact $b$ of relay 4P. Relay 5P at each station arranged to receive a long fourth step and also having its relay 4P picked up is energized over a corresponding branch 128a of circuit 128, and the energized relays 4P then release.

When the office relay 5P picks up, its contact $f$ opens circuit 27a, releasing relay OT to close the line circuit to begin the fifth step, and also prepares a circuit 29a comprising a connection to terminal B over circuit 10a and front contact $f$ of relay 5P to circuit 29, over which relay OT is controlled to make the fifth step long. Circuit 29 extends through OT to terminal C over front contacts $f$ of relays OM and C2 and back contact $f$ of relay B2.

Relays L2 now pick up, and each opens circuit 24b and closes the branch 14c of circuit 14 to pick up relay A2 and to operate relay Z to the left. Each relay C3 is deenergized, and upon releasing, its contact $c$ opens circuit 14c, deenergizing relay A2, and closes circuit 14d to pick up relay B2. Each relay A2 then releases, and its contact $b$ opens circuit 14d, deenergizing relay B2, and closes circuit 14e to pick up relay C2. Each relay B2 then releases, and the office relay B2 at its back contact $f$ completes circuit 29a for relay OT, which picks up to open the line circuit to terminate the fifth step.

Each line relay L2 now releases, and since the relays C2 are now picked up, a stick circuit for each relay C2 comprising the branch 18b of circuit 18 becomes closed. Each relay Y is operated to the left over circuit 18, whereupon the office relay 6P is energized over a branch 30b of circuit 30 including front contact $d$ of relay C2 and contact $b$ of relay 5P. Relay 6P at each station arranged to receive a long fifth step and also having its relay 5P picked up is energized over a corresponding branch 130b of circuit 130, and the energized relays 5P then release.

When the office relay 6P picks up, its contact $f$ opens circuit 29a, releasing relay OT to close the line to begin the sixth step, and prepares a circuit 23b extending from terminal B over circuit 10a and front contact $f$ of relay 6P to circuit 23. Relay OT is controlled over circuit 23b to make the sixth step short.

Relays L2 now pick up, opening each circuit 18b and closing each circuit 22d to pick up relay A3 and to operate relay Z to the right.

When the office relay A3 picks up, its contact f completes circuit 23b for relay OT, which picks up to open the line to terminate the sixth step.

Each line relay L2 now releases, completing the stick circuit 24a for relay A3 and operating relay Y to the right. At the office, relay 7P picks up over a branch 31a of circuit 31 including front contact d of relay A3, and at one or two stations only, relay 7P picks up over a corresponding branch 131a of circuit 131.

When the office relay 7P picks up, its contact f opens circuit 23b, releasing relay OT to close the line to begin the seventh step, and prepares a circuit 26b at its front contact f similar to circuit 26a already traced, to make the seventh step short.

Relays L2 now pick up, opening each circuit 24a, and closing each circuit 14b to pick up relay A2 and operate relay Z to the left. Contact f of the office relay A2 completes circuit 26b to cause relay OT to pick up to open the line circuit to terminate the seventh step.

Each line relay L2 now releases, completing the stick circuit 18a for relay A2 and operating relay Y to the left. At the office, relay 8P picks up over circuit 19b including contact b of relay 7P, and at the same time relay ID picks up over the branch 20d of circuit 20 including contact d of relay 7P to register the short seventh step, and completes a stick circuit 21c over which relay ID is held energized until the end of the code. At the selected station, relay D, Fig. 2B, is picked up over a branch 120d of circuit 120 which includes the left-hand contact d of relay CR and front contact d of relay 7P, and relay 2PS is picked up over a branch 120e of circuit 120 which includes the left-hand contact b of relay CR and front contact b of relay 7P. Relays 7P now release due to the opening of their stick circuits 25 and 125 by relays Y, and upon the release of the relay 7P at the selected station, relay CR is energized over a branch 121c of circuit 121 extending from terminal B at contact b of relay A1 through the lower winding of relay CR, contact a and winding of relay D to terminal C. Relay CR operates its contacts to the right in response to the energization of circuit 121c. This circuit also constitutes a stick circuit for relay D, and being connected directly to terminal B at back contact b of relay A1, remains closed until the end of the code. Contact c of relay CR connects circuits 128 and 131 together, and the right-hand contact d of relay CR connects circuits 120 and 130 together. This enables the station relays 4P to 7P to be operated in unison with the office relays 10P to 13P, respectively, on the function steps of the code, irrespective of their code character, but without the necessity for the provision of additional energizing circuits for these relays, as employed for example in the system of the Snavely and Miller application, Serial No. 222,860, hereinbefore referred to.

The apparatus is so arranged that no interference will occur in case levers of other panels are operated during the code or prior to its initiation. The pick-up circuit 9 for all SP relays is opened at the beginning of the code, but it may happen that other SP relays such as the relay 2SP are picked up before the code begins. In that case circuit 10b provides another connection to terminal B in multiple with circuit 10a which does not interfere with the transmission in any way. It will be seen that when relay 7P is picked up circuit 26b makes the step short regardless of the condition of circuit 29b and the code is determined solely by 1SP, relay 2SP remaining energized to initiate its code after the termination of the code in progress. It is obvious that a similar result occurs on any other step of a code when both characters are available, a short step taking precedence over a long one in each case.

Although relay 1SP was picked up over circuit 1 including the lever contacts, it is held energized independently of these contacts during the transmission of the station selecting steps. This insures that no energized SP relay will be released by lever operation to possibly change the character of an impulse so as to select an undesired station.

When relay ID picks up, (Fig. 1B), at the end of the seventh step, its contact f again inserts circuit 1 into the connection to terminal C for the stick circuit 15 for relay 1SP. Since now the transmission is under the control of relay 1SP alone, even though other relays SP are energized, the transmission will be stopped, and a new code initiated, in case a lever of the selected panel is operated during transmission of the function steps. This insures that the controlled device will be operated to a position to correspond with the lever position even though the lever is operated after the step to which the lever is assigned has been transmitted.

Relay ID upon becoming energized also opens the circuit 16a, releasing OT to close the line to begin the eighth step, and prepares a new transmitting circuit 32 extending from terminal B at contact c of relay 1SP, over front contact e of relay ID, back contact d of relay 12P to contact e of relay 11P, from which point various branches extend over the front contacts e of relays 8P to 11P and contacts of the lever controlled relays 1PR, 2GC, 2HC and 2PR to circuit 23, 26, 27 or 29, and thence through relay OT to terminal C.

The eighth step is controlled by circuit 23c or 27c selected by contact b of relay 1PR. Since relay 1PR has been reversed, the energization of relay 8P prepares circuit 27c at its front contact e, to make the eighth step long.

The apparatus functions on the eighth step in the same manner as on the long fourth step already described, relays A3, B2 and C3 operating in order, the step being terminated upon the release of relay B2.

To insure against incorrect registration of a function step at the field station in the event of a line failure, the character of each function step is not registered at the receiving station until the line is closed to begin the next step. When the line opens at the end of the eighth step, relay 9P at the office and relay 3P at the station pick up and the long character of that step is "stored" at the station by relay C3 which is held energized over its stick circuit 24b. Relay 9P upon becoming energized opens circuit 27c and prepares a new circuit 26c for relay OT, to make the ninth step short to correspond with the released position of relay 2GC. Relay OT therefore releases and closes the line to begin the ninth step, and then each relay L2 picks up, closing circuit 14 to operate relay Z to the left. At the selected station, relay C3 is still picked up, and relay Z closes the branch 133 of a register circuit 134 prepared by relays D and 3P, which extends from terminal B at resistor r2, Fig. 2C, contact a of relay 1MP, the winding of relay 1WS, contact d of relay 3P, contacts c of relays D, 1R and Z, contact e of relay C3 to terminal C.

Relay IWS is energized momentarily over circuit 133 to close its right-hand contacts, energizing the switch control relay IWZ to reverse, to thereby actuate the switch machine ISM in a well-known manner to close and lock the track switch IW in its reverse position.

In a control code having a short eighth step controlled by relay IPR in its normal position, relay A3 will be held energized until the beginning of the ninth step in place of relay C3 and the impulse delivered over circuit 134 to circuit 133 will be in the opposite direction, from terminal B at contact e of relay A3 through relay IWS to terminal C at resistor r3, to cause relay IWS to close its left-hand contacts, as shown.

Relay A2 picks up at the beginning of the ninth step and terminates the step by closing circuit 26c, Fig. 1C.

When the line opens at the end of the short ninth step, relay 10P at the office and relay 4P at the station pick up and the short character of that step is stored at the station by relay A2 which is held energized over its stick circuit 18a. Relay 10P upon becoming energized opens circuit 26c and prepares a new circuit 23d for relay OT to make the tenth step short to correspond with the positions of contact d of relay 2HC. Relay OT therefore releases and closes the line to begin the tenth step, and then each relay L2 picks up, closing circuit 22 to operate relay Z to the right. At the station, relay A2 is still picked up and relay Z completes a circuit 135, Fig. 2B, for relay 2GS, which has been prepared by relays D and 4P and is a branch of circuit 136 extending from contacts d of relays IR, D and 4P through the winding of relay 2GS, back contact f of relay 7P, to circuit 121 and thence to terminal B at contact b of relay AI.

Since the circuit 136 is now connected over contact d of relay Z and contact e of relay A2 to terminal B, both ends of circuit 135 for relay 2GS are at the same potential and relay 2GS is not operated.

In a signal control code initiated by lever 2SG, relay 2GC is picked up in response to the lever operation. and prepares circuit 29c to make the ninth step long, in which case relay C2 will be held energized until the beginning of the tenth step in place of relay A2 and will connect terminal C to circuit 135—136 to pick up relay 2GS, and relay 2GS will be held energized over a stick circuit 121d extending to terminal C at its contact a and to terminal B over circuit 121. Circuit 121d will be opened to release relay 2GS when relay 7P picks up at the end of the twelfth step.

Relay A3 picks up at the beginning of the tenth step, and in the code being described, terminates the step by closing circuit 23d. Relays L2 then release, relays IIP at the office and relay 5P at the station pick up and the character of that step is stored by relay A3, in the code being described, or by relay C3 if the tenth step is long. Relay IIP upon becoming energized opens circuit 23d and prepares a new circuit 26d for relay OT to make the eleventh step short to correspond with the position of contact e of relay 2HC. Relay OT therefore releases and closes the line to begin the eleventh step, and then the line relay L2 picks up, operating the station relay Z to the left to close its contact c in circuit 134. A branch 137 of circuit 134 extends over contact d of relay 5P and contact c of relay 2GS through the lower winding of the polar stick signal control relay 2LHS to terminal B or C, but this circuit is open at contact c of relay 2GS so that there is no impulse delivered to relay 2LHS in this case.

Relay A2 picks up at the beginning of the eleventh step and terminates the step by closing circuit 26d. Relays L2 then release, relays 12P at the office and relay 6P at the station pick up and the character of that step is stored by relay A2, in the code being described, or by relay C2 if the eleventh step is long.

Relay 12P upon becoming energized opens circuit 32 at its contact d thereby disconnecting terminal B from circuit 26d to release relay OT, and prepares a new circuit 23f for relay OT extending from terminal B over back contacts f of relays 15P, 14P, 13P and front contact f of relay 12P to circuit 23, to make the twelfth step short. Relay OT therefore releases and closes the line to begin the twelfth step, and then each line relay L2 picks up, operating relays Z to the right to prepare circuit 136 to register the character of the eleventh impulse. A branch 138 of this circuit extends over contacts d of relays 6P and 2GS through the lower winding of the signal control relay 2RHS to terminal B or C, but this circuit is not closed and no impulse is delivered to relay 2RHS in this case.

Relay A3 picks up at the beginning of the twelfth step and terminates the step by closing circuit 23f. Relays L2 release, and relay 13P is picked up over a branch of circuit 25 including front contact b of relay 12P. Relay PC is restored to normal at this time, circuit 39 which extends through its upper winding to terminal C being energized by a connection over the branch circuit 39a extending over back contact d of relay OR, Fig. 1B, and the normally closed contact of a recall key RC to contact e of relay 12P and thence over circuit 25 to terminal B. The station relay 7P is also picked up at this time.

Relay 13P upon becoming energized completes the pick-up circuit 40 for relay IS from terminal B over contact c of relay ISP, contact d of relay ID, the upper winding of relay IS, contact d of relay 13P to terminal C at contact b of relay OM. Relay IS picks up, reestablishing its stick circuit I, and opening the stick circuit 15—I for relay ISP, which relay releases. Back contact f of relay 13P opens circuit 23f so that relay OT releases to terminate the code.

Since relay PC has been restored to normal, the line circuit is now supplied with current of normal polarity and relay LI picks up at the office and at each station in place of relay L2, each closing circuit 8 to pick up relays W and AI, and opening circuit 24 to deenergize relays X, Y and A3. Relays X open their contacts c to release the office relay 13P and the station relay 7P. The office relay AI at its back contact b opens circuits 21a and 21c, releasing relays OM and ID, and the station relay AI opens circuits 121a and 121c, releasing relays IR and D. Relay CR is left reversed, but this is of no moment, because it will be restored to normal upon the closing of circuit 113 at the beginning of the next code.

This completes the restoration of the apparatus to normal. In the event one or more of the relays S at the office or stations is now in its released position, the initiating circuit 10 for relay OT or the similar circuit 110 for the station transmitter relay T becomes closed as soon as relay AI picks up and relay X releases at the end of a code. It follows that the line circuit is energized by a short positive impulse between each two successive codes.

In response to the control code just described, an indication code will be initiated at the beginning of the operation of the track switch, upon the release of the normal switch indication relay 1NWP, to indicate the open or unlocked condition of the switch. This code is also initiated when the switch is opened due to conditions in the field, in which case relay 1WK, Fig. 1C, is reversed by the code to light lamp 1WE. Since relay 1WK has been already reversed by closing circuit 3, the first indication code following a switch control code does not change the condition of the office apparatus. A second code follows, however, when the track switch becomes closed and locked reverse, upon the energization of the reverse switch indication relay 1RWP, as will now be described.

When relay 1RWP releases, its contact e momentarily opens the holding circuit 101 for the station starting relay S, Fig. 2B, which relay releases. Circuit 101 is similar to the circuit 1 for the office starting relay 1S and includes in series, contacts e of all relays controlling the character of indications to be transmitted, as will be clear from Fig. 2C. Relay S, at its back contact c completes circuit 110 to pick up relay T, Fig. 2A, to initiate the code. Relays L1 release, relay PC reverses, and then relay T is energized repeatedly over circuits 123, 126, 127 and 129 which correspond to the office circuits 23, 26, 27 and 29 already described; relays L2 and the relays controlled thereby operate and the code is transmitted and received in the same manner as the control code already described, except for those differences now to be pointed out.

At the station, the circuit controlled over front contact f of relay 1P is a branch 129a of circuit 129, and consequently the first step of an indication code is always long, whereas in a control code, it is always short. When the first impulse is long, relays L2 are held energized until relays C2 pick up and relays B2 release, and at the end of the impulse, relay 2PL is picked up in place of relays 2PS and R, over circuit 130a, in unison with the office relay 2P, and at the same time, the office relay OR is picked up over a corresponding circuit 30a in place of relay OM, relay OR being held energized over a stick circuit 21b until the end of the code.

The arrangement is such as to insure that no interference occurs in the event the office and one or more stations initiate codes at the same time. In that case relay OT makes the first step short, thereby placing the station apparatus in condition to receive the control code, as hereinbefore described.

The second step of an indication code is used for selection between stations so as to prevent any station from sending more than one code in the event another station has a code stored for transmission, as hereinafter explained. In the present instance, assuming that only one station is transmitting, it will be seen that when relay 2PL picks up, it opens circuit 129a at its back contact f to release relay T to begin the second step, and prepares a circuit 127a for relay T extending to terminal B at back contact c of relay S over circuit 110, to make the second step long. Relay 2PL also controls a circuit 123a at its contact e over which relay T may be controlled under conditions hereinafter described, to make the second step short, but circuit 123a is not effective in the code being described. The second step therefore is terminated by closing circuit 127a upon the release of relay B2 following the energization of relay C3, and is a long step.

Line relays L2 then release, relays Y operate to the right, and at the station having its relay S released relay M is picked up over a circuit 128b extending from terminal B over circuit 128 to the back contact b of relay SS, front contact c of 2PL, back contact b of relay S, the upper winding of relay M and then over circuit 101 to terminal C at front contact e of relay 1MP. Relay M upon becoming energized completes a stick circuit 121b extending from terminal B over circuit 121 and front contact a of relay M, back contact b of relay D, the lower winding of relay M to terminal C. Relay M is now controlled like relay 1SP in the control code hereinbefore described, for similar reasons. Circuit 121b corresponds to circuit 15 and holds relay M energized independently of circuit 101 until relay D picks up, at which time contact b of relay D opens circuit 121b and closes circuit 121e extending from terminal B over circuit 121, front contact a of relay M, front contact b of relay D, back contact b of relay S, through the upper winding of relay M and thence over circuit 101 to terminal C, circuit 121e holding relay M energized until relay S picks up at the end of the code. The control of relay M over circuit 101 insures the initiation of a new code in case one of the indication relays at the station shifts its position during this part of the code.

At the end of the second step, the station relay 3P is picked up over contact b of relay 2PL in the code being described, and then relay 2PL releases, and the operations on the station selecting steps three to seven, inclusive, are the same as on the corresponding steps of the control code except that relay T controls the transmission instead of relay OT. The lengths of these steps is determined by the connections of the various branches of circuit 132a over the contacts e of relays 3P to 7P, as will be apparent from Fig. 2B.

It is to be understood that the relays S at the various stations release whenever a change occurs in the condition of one of the controlling relays. If during the code being described, relays S at other stations release subsequent to the opening of the pick-up circuit 128b for relay M, which occurs upon the relase of relay 2PL, these stations will be eliminated by station selection, due to the fact that their relays M cannot pick up, and will have no effect upon the code. If, however, any relay S at another station releases prior to the end of the second step, its apparatus will be in the same condition as that at the station being described, its relay T will be operated in unison with the one at that station, and its relay M will pick up as above described. Therefore a plurality of stations may start the third step of the code, but all but the one having the superior code call will be eliminated by station selection, since the code delivered to the line circuit is characteristic of one station only.

At the station having its code call connections arranged as in Fig. 2B, a circuit 126a is prepared by relay 3P to make the third step short, and the corresponding circuit at another station arranged to make the third step long will be ineffective. At such other station, the connections from wires 120 and 130 to contacts b and c of relay 3P will be interchanged, and the energization of circuit 120 which picks up relay 4P at the selected station will at each station connected to receive a long third step complete a branch 141a of a circuit 141 for a storage relay SS provided relay M at such station is energized. Circuit 141a extends from terminal B over circuit 126, contact c of relay 3P, back contact e of relay D, front contact c of relay M, back contact e of relay 14P, relay SS to terminal C. It will be seen that relay SS will pick up at each station having its M relay energized except at the one having the superior code, at the end of one of the station selecting steps, over a branch of circuit 141 including contact c of one of the relays 3P to 7P, inclusive. Each energized relay SS completes a stick circuit 142 extending to terminal B over its contact a and back contact d of relay 2PL or back contact b of relay M, and is released during the transmission of a succeeding indication code. When relay SS picks up on any step the associated relay P fails to pick up, consequently the stepping and transmitting relay operations at the inferior stations are discontinued on one or another of the station selecting steps until finally there is but one station left in control of the line. At the end of the seventh step, the selected relay ID at the office and the corresponding relay D at the selected station pick up along with relays 2P and 2PS, and relay CR operates as in the case of a control code. Relay CR at its right-hand contact a connects terminal B to circuit 132b having various branches completed over contacts f of the relays P as shown in Fig. 2C, for controlling relay T to transmit the function steps of the indication code, the character of which is determined in accordance with the positions of contacts f of the station relays 1TR, etc.

In the code being described, the eighth, ninth and tenth steps will be short, relay T being operated over branches 123c, 126c and 123d of circuit 132b controlled respectively by the detector track relay 1TR and by the approach relays 2RAR and 2LAR in their energized positions, as shown. The eighth step is terminated when the station relay A3 picks up to complete circuit 123c, and its short character will be stored by the office relay A3 until the beginning of the ninth step, when a branch 33 of circuit 34 is closed momentarily from terminal B at contact e of relay A3, Fig. 1A, contact c of relay Z, contacts b of relays OR and 1D, contact c of relay 9P, through the windings of relays 1TK and XR, resistor r3 to terminal C, relays 1TK and XR being energized in a direction to close their left-hand contacts, as shown.

The ninth step is terminated when the station relay A2 picks up to complete circuit 126c and its short character is stored by the office relay A2, which at the beginning of the tenth step delivers an impulse of normal polarity over circuits 36 and 37 to relays 2RAK and XR. The short tenth step, controlled over circuit 123d, is similar to the eighth, and at the beginning of the eleventh step relay A3 delivers an impulse of normal polarity over circuits 34 and 38 to relays 2LAK and XR.

In an indication code transmitted while the track relay 1TR is released, the eighth step is controlled by circuit 127c, Fig. 2C, and is a long step, and the character is stored by relay C3 in place of relay A3 in which case, at the beginning of the ninth step circuit 33 is energized momentarily by an impulse of reverse polarity. Circuit 33 may be traced from terminal B at resistor r2, Fig. 1C, through relays XR and TR over circuit 34 to terminal C at contact e of relay C3. Relay 1TK is a stick polar relay for indicating the condition of the track section 1t of Fig. 2C, and its contact a remains closed to light the track indication lamp 1TE. In a similar manner, lamp 2RAE is lighted by the transmission of a long tenth impulse when section 10t is occupied, and lamp 2LAE by the transmission of a long eleventh impulse when section 2t is occupied. Relay XR is a biased polar relay and closes its contact a only for the duration of an impulse of current of reverse polarity supplied to any of the track or approach indication relays. The neutral relay TKP which is normally energized over a circuit 43 including the pole-changing contacts b and c of the track and approach indication relays, in series, as shown in Fig. 1C, has its polarity reversed upon a change in position of any of these relays, which causes it to momentarily close its back contact a. Consequently when relay 1TK, 2RAK or 2LAK operates from normal to reverse, relays XR and TKP close their contacts momentarily to complete a circuit for the bell XB. The sounding of bell XB therefore indicates the entrance of a train upon one of the controlling track sections 1t, 2t or 10t of Fig. 1C and the bell will be sounded repeatedly on successive steps of the code in case a plurality of the indication relays are operated to reverse on different steps. On the other hand, it will be clear that the bell is not sounded upon the repetition of an existing indication, in which case relay TKP is not operated, nor upon the receipt of a track clear or approach clear indication, in which case relay XR is not operated.

The eleventh step is controlled over circuit 129d, Fig. 2C, relay 1NWP being released, and its long character is stored by relay C2 to supply an impulse of reverse polarity over circuit 44 to the upper winding of relay 1WK of Fig. 1C. Since relay 1PR is now reversed, circuit 44 is open at left-hand contact c of relay 1PR and the impulse is not delivered.

The twelfth step is controlled over circuit 123e, relay 1RWP being energized. The indication code is not terminated with the twelfth step, but relay T is controlled over front contacts f of relays 7P and 14P to transmit two additional steps to indicate the condition of the signals and of the locking relay 1MP.

The short character of the twelfth step is stored by relay A3 which at the beginning of the thirteenth step delivers an impulse of normal polarity over circuits 34 and 45 to the upper winding of relay 1WK, which is thereupon operated to the left to extinguish lamp 1WE, de-energize relay 1PR to lock that relay reversed, and to reenergize relay 1WC over the branch of circuit 4 which includes the right-hand contacts c of relay 1PR and lever 1SW. The closing of contact c of relay 1WC renders lever 2SG available for controlling the signals. The thirteenth and fourteenth steps are short, being controlled over circuits 126e and 123f, respectively, and are registered at the office by momentarily energizing relays 2HK and 2MK to the left over circuits 46 and 47 at the beginning of the fourteenth and fifteenth steps, respectively.

At the end of the fourteenth step relay S is picked up over circuit 140 extending from terminal B over circuit 125, contacts c of relays 14P and M, front contact e of relay 14P, the upper winding of relay S over circuit 101 to terminal C, reestablishing the holding circuit 101 for relay S from terminal B at contact f of relay 1R, resistor r1, contact a and the lower winding of relay S to terminal C at contact e of relay IMP. Subsequently relay 14P releases and provides another connection from terminal B to circuit 101 at its back contact d. Relay S opens circuit 121e at its contact b, releasing relay M, and disconnects terminal B from circuit 110 by opening its back contact c. Relay M opens the circuit 121—132—132b—123f—123, thereby releasing relay T to begin the fifteenth step. No further operations of the station relay T occur, the last step of each indication code being a short impulse terminated by the operation of the office relay OT.

At the office, relay 15P picks up over circuit 25 and contact b of relay 14P at the end of the fourteenth step, and when relay A2 picks up on the fifteenth step a circuit 17b is closed from terminal B over front contact f of relay 15P to pick up relay OT to terminate the step.

Relay L2 then releases, operating relay Y to the left, opening circuit 25 to deenergize relay 15P and connecting terminal B over circuit 19 to circuit 39 at front contact b of relay 15P to complete that circuit momentarily to restore relay PC to normal. Relay 15P then releases, opening circuit 17b to deenergize relay OT. Since relay PC is normal, relays L1 now pick up, closing circuit 8 to reenergize relays W and A1 and releasing relays X and A2. The relays A1 open circuits 21 and 121 for relays M, OR, ID and D which completes the restoration of the apparatus to normal.

It will be evident from the foregoing, that at the end of the indication code just described, there may be a plurality of relays S at other stations which are released to store codes for transmission. Each of these relays will complete its circuit 110 to initiate the next code as soon as a short positive impulse has been transmitted. These stations may be divided into two groups, the first comprising those at which relay M picked up at the end of the second step of the preceding code, at each of which relay SS is now energized and relay S is released, and the second comprising those at which relay S released too late to effect the energization of relays M and SS.

Relays M at the stations of the first group are also now released, due to the opening of circuit 121b at the end of the preceding code, and although the pick-up circuit 128b for relay M at each of these stations is open at back contact b of relay SS a new pick-up circuit 128c is prepared, which extends to terminal B at front contact b of relay SS.

The stations of both groups will transmit the first step in unison, and this will be a long step, provided the office transmitter remains inactive, which will be registered by the energization of relay 2PL at the end of the first step, whereupon relay 2PL at its contact c will complete circuit 128c to pick up relay M at each station of the first group only, each such relay closing its stick circuit 121b and opening circuit 142 to release relay SS, since contact d of relay 2PL and contact b of relay M are both open. These relays M therefore now pick up at the end of the first step, whereas in the preceding code they picked up at the end of the second step. The branch circuit 123a for relay T is now connected to terminal B over circuits 132a, 132, contact a of relay M and circuit 121 at each station of the first group. These stations therefore cause the code to have a short second step, so that circuit 128b will not be closed at the end of the step, consequently the relays M, and likewise the relays T and SS, at stations of the second group remain deenergized. The stepping operations at all but one station of the first group, and at all stations of the second group, will be discontinued on one or another of the station selecting steps, as in the code already described, while at each inferior station of the first group only, relay SS will pick up when the character of an impulse does not correspond to the station code call, to give that station precedence over any station of the second group. In this manner, each station of the first group transmits its code in turn, in the order of code superiority.

At the end of this group of codes, conditions are the same as at the beginning of the first indication code; that is, a plurality of relays S may have been released to store codes, but no relay SS is energized. Therefore as soon as the line becomes free these stations initiate a code having a long second step, and transmit their codes in order as a group in which each code except the first has a short second step, as already described.

This feature insures that new code storages cannot delay the transmission of previously stored codes, even though the new codes have superior code calls.

Our apparatus includes a "recall' feature by which the operator may initiate an indication code from any station without causing a change in the condition of any station device. To do this, he presses one of the control levers of the corresponding office panel momentarily to initiate the transmission of a control code to the desired station, holding the recall key RC, Fig. 1B, in its reversed position until the code is completed.

The operation of key RC shifts the control of the restoring circuit 39 for relay PC from relay 12P to relay 14P, so that two additional steps will be transmitted, in which case relay PC is restored by an impulse transmitted over circuit 39b at the end of the fourteenth step. Circuit 101 for the station starting relay S, Fig. 2B, normally has two connections to terminal B, one at back contact f of relay IR and the other at back contact d of 14P, both of which are opened on the fourteenth step of the "recall" control code to release relay S, as required.

It is to be noted that our apparatus is so arranged as to minimize the effect of the failure of any relay circuit upon the system as a whole. It has been explained that to produce the intervals between steps, relay T or OT is held energized until the relay P for the next step picks up over a circuit including a front contact e or f of the relay P for the preceding step. The latter relay although picked up has just been deenergized by the operation of contact b of relay Y, and will restore the line to the closed condition in case the next P relay fails. In case circuit 18 or 24 fails to close to operate Y to release relay P for the preceding step, relay X in series therewith will release to open the circuit for the P relays at its contact c to insure that the line circuit will become closed. The effect of the failure of any of the pick-up circuits for relay T or OT to close will also result in holding the line steadily closed on the corresponding step. In either case, the step will not be terminated upon the release of relay B2 following the energization of relay C2 or C3 as described but an additional relay D2 or D3 at the office will be operated, which in turn will be deenergized by the release of relay C2 or C3 and will release in turn to open the circuit 14 or 22 for relay X at its contact b. Furthermore, a failure of any of the pick-up or stick circuits for the timing relays will release relay X. Relay X, upon releasing due to any of the causes mentioned, completes the branch circuit 39c to restore relay PC and thereby reset the apparatus to normal in the same manner as at the end of a complete code, whereupon a new code is initiated.

A defective station therefore will repeatedly operate in this manner until its code is successfully completed or until it is manually disconnected. A defective station cannot interfere with others by the failure of its T relay to pick up on any step unless it is capable of picking up its M relay, and then it will control the transmission only if its code call is superior, in which case its relay SS will be released the same as if it had transmitted a complete code. It follows then that a station can transmit only one incomplete code as long as other stations have codes stored for transmission.

The manual stepping apparatus of Fig. 4 is provided to enable the progression to be stopped on each step to enable the operation to be more readily observed, since the normal speed of operation is much higher than that usually attained in apparatus of this character, the time of a complete fifteen step code being of the order of one second. This apparatus is also shown in the Snavely et al. application, Serial No. 223,287, hereinbefore referred to, and is cut into operation by opening a manual switch 2PB.

When switch 2PB is open, and relay LO is released by opening the line circuit, relay LO holds the line open at its contact a, thereby holding the code apparatus inactive for observation.

If the push button IPB is now operated, its contact b closes a pick-up circuit for the stick relay LR, which closes the line circuit at its contact c upon the release of button IPB to advance the code apparatus to the next step, whereupon relay LO picks up, releasing relay LR, and when relay LO is again released by code action it holds the line open until button IPB is again operated.

I shall next describe the transmission of a control code for clearing a signal. I shall assume that this code follows the indication code last described and that the track switch is now reversed and that the operator desires to clear signal 2LB.

Referring to Fig. 1C, relay IWC is now energized over circuit 4 with relay IPR and lever ISW both reversed.

The operator now presses lever 2SG, opening circuit 1 and releasing relay IS which relay, at its back contact c, completes circuit 48 through relay 2GC to terminal B at contact a of lever 2SG, and relay 2GC picks up, completing its stick circuit 48a extending to terminal B at contact a of relay 2NC. Lever 2SG is now turned to the left, opening circuit 2 to release relay 2NC, thereby opening circuit 3 controlled by the switch lever ISW to lock relay IPR reversed, and completing circuit 5 from terminal B over the left-hand contacts c of lever 2SG and relay 2PR, front contacts c of relays IWC and 2GC through relay 2HC to terminal C. Lever 2SG is then released, and upon the opening of its contact a, the stick polar relay 2MK becomes energized in series with relay 2GC over circuit 48b extending from terminal B through the lower winding of relay 2MK, contact b of relay 2HC, contact a and winding of relay 2GC over circuit 48 to terminal C. Relay 2GC is held energized, and relay 2MK operated to the right over circuit 48b. Contact a of relay 2MK locks relay 2PR normal, contact b prepares a stick circuit 5a for relay 2HC and contact c opens circuit 2 to prevent the energization of relay 2NC if lever 2SG is restored to normal while relay 2MK is reversed. The closing of contact b of lever 2SG connects terminal C over circuit 1 to circuit 9 for relay ISP, which relay picks up, energizing relay OT to initiate the control code.

This control code differs from that hereinbefore described only in that the ninth step, being controlled over circuit 29c, is long, so that relay 2GS, Fig. 2B, picks up over circuits 136 and 135 at the beginning of the tenth step. The tenth step is long, being now controlled over circuit 27d, Fig. 1C, in place of circuit 23d, while the eleventh step is short, being controlled over circuit 26e in place of circuit 26d. Since relay 2GS becomes energized, relay 2LHS, Fig. 2C, is operated to the right over circuits 134 and 137 and relay 2RHS is energized in its normal direction to close its left-hand contacts, as shown, over circuits 136 and 138. Contact d of relay 2LHS opens circuit 143 for relay IMP, which releases and in turn releases relay S. At the end of the control code, circuit 48 is opened by relay IS and relay 2GC releases, relay 2MK remaining reversed and relay 2HC being held energized over its stick circuit 5a.

Relay S having been released by relay IMP, an indication code is now transmitted having a long fourteenth step for operating relay 2MK to the right, but relay 2MK already occupies that position.

The signal relays 2LAG and 2LBG are controlled over a two wire line circuit 149 including right-hand contact a of relay 2LHS and energized by a source of current of reversible polarity indicated by the reference ± adjacent the contacts of relay I0TR, which circuit, as may be traced in Fig. 2C, includes the normally open back contacts a and b of the approach locking relay 2LAS controlled by the signal relays 2LAG and 2LBG. If circuit 149 is energized from the source up to these contacts, the block relay 2BR which is bridged across circuit 149 over right-hand contact b of relay 2LHS becomes energized. The circuit for relay 2LAS has two connections to terminal B, one over left-hand contact c of relay 2LHS and the other over back contact a of relay 2BR. It follows that relay 2LAS releases in response to the energization of relay 2BR to permit relay 2LBG to be energized to clear the signal 2LB, in the case being described.

It will be seen that the clearing of the signal is made dependent upon the release of the approach locking relay and thus can be effected only after the track switch has been locked in the required position. The provision of the block relay 2BR prevents the operator from inadvertently releasing an approach locking relay to lock a route which is unavailable only to find that he has thereby rendered the time locking of the relay effective, as explained in the Young patent hereinbefore referred to, and is unable to correct his error and consequently is delayed in setting up any other route.

The energization of relay 2LBG releases the signal indication relay 2LGP, thereby initiating an indication code having a long thirteenth step, resulting in the operation, at the office, of relay 2HK to the right, completing circuit 50 to light the signal indication lamp 2HE.

I shall now assume that the cleared signal 2LB is put manually to stop, by code. The pressing of lever 2SG by the operator opens circuit 1 and closes circuit 48, thereby releasing relay 1S and picking up relay 2GC, the code being initiated when lever 2SG has been moved to its center position and released. Relay 2GC opens circuit 5a, releasing relay 2HC, so that the tenth and eleventh steps of the resulting control code are both short, consequently relay 2LHS is operated to the left, relay 2RHS being already in the required position. The release of relay 2HC connects circuit 50 to terminal FB of a source of interrupted current to cause lamp 2HE to display a flashing indication. In the field, relay 2LGP becomes reenergized, and in case the approach section for the signal is unoccupied, relay 1MP becomes reenergized over circuit 143. The resulting indication code restores relays 2HK and 2MK to normal, as shown, whereupon relay 2NC becomes reenergized over circuit 2 and extinguishes lamp 2HE. On the other hand, if the signal is put manually to stop when the approach section is occupied, relay 2RAS will remain released, relay 1MP will be held deenergized by relay 2RAR, relay 2MK will remain reversed, and consequently the flashing indication will persist until the time locking for the route is released as manifested by the reenergization of relay 2RAS.

I shall next assume that the cleared signal 2LG is put to stop automatically by a train entering the detector track section 1t of Fig. 2C.

The track relay 1TR will be shunted by the train and will release, deenergizing its slow acting repeater relay 1TZ and releasing the signal relay 2LBG to pick up the signal indication relay 2LGP. Relay 2LHS will be restored to the left due to the momentary closing of its restoring circuit 151 by relays 1TR and 1TZ. Relay 1MP remains released since its circuit 143 includes contact j of relay 1TR. Relays 1TR and 2LGP initiate an indication code which reverses relay 1TK, Fig. 1C, restores relay 2HK to normal and maintains relay 2MK reversed to hold relay 2HC energized. Relay 1TK causes lamp 1TE to become lighted to indicate track occupancy, and lamp 2HE becomes dark, with lever 2SG in its left-hand position.

If lever 2SG is now restored to normal, with the detector section occupied, relay 2HC will be released and a stop signal control code will be transmitted, and lamp 2HE will be caused to display a flashing indication which will persist until a further change in conditions occurs.

When the train vacates the detector section relays 1TR, 1MP and 1TZ will pick up, and an indication code will be initiated which will restore relays 1TK and 2MK to the left and maintain relay 2HK in its left-hand position. Relay 2MK will release relay 2HC, causing lamp 2HE to flash if lever 2SG is still reversed, but if lever 2SG has already been restored to normal and lamp 2HE is flashing, relay 2NC will become energized and extinguish lamp 2HE. If this indication causes lamp 2HE to flash, the operator will then restore lever 2SG to normal to pick up relay 2NC, in any case, the restoration of lever 2SG to normal with lamp 2HE dark completes the restoration of the panel apparatus to its normal condition.

In the foregoing it has been assumed that the signals are normally at stop, but they may also be arranged to clear automatically after the passage of a train, as may be of advantage when a fleet of closely spaced trains is to be moved in the same direction. This "non-stick" operation is effected by reversing an auxiliary lever 2NS associated with the signal lever 2SG. Contact b of lever 2NS then removes a shunt from contact b of relay 2HK so that the latter contact becomes effective to open circuit 1 to initiate a control code automatically due to its movement from right to left upon receipt of a signal stop indication code. The movement of contact b of relay 2HK from left to right upon receipt of a signal clear code is not effective to open circuit 1 because contact d of relay 1TK controlled by the track relay 1TR is then closed, relay 1TK being operated on an earlier step of the code. Assuming that lever 2NS is reversed with lever 2SG remaining in its left-hand position, and that a signal clear code has been transmitted so that relay 2HC is held energized over its stick circuit 5a, it will be seen that the stop signal indication code due to a train entering the detector section 1t will operate relay 2HK to the left, relay 2MK remaining to the right as above described, and that contact b of relay 2HK will open circuit 1 momentarily to initiate a new control code, while contact a of relay 2HK will complete a circuit 48c from terminal B through the lower winding of relay 2MK, contact b of relay 2HC, right-hand contact c of relay 2MK, contact c of lever 2NS, contact a of relay 2HK through relay 2GC and circuit 48 to terminal C, to pick up relay 2GC to render the code effective to clear the signal. Even if this control code is initiated after section 1t is vacated, that is to say, by an indication code including an impulse for restoring relay 2MK to normal, the same result will follow, relay 2MK being held reversed by the energization of circuit 48c even though its effect is momentarily neutralized by a restoring impulse received over circuit 47.

From the foregoing the advantage of the provision of a separate signal selecting step controlled by relay 2GC will be seen, as it permits two or more signals at a station to be controlled independently on different steps of a composite code, in such a manner that the signal control relays in the field will not be energized by control code impulses in the event the code is initiated in response to the operation of a lever not associated with these relays. In other words, since there is a possibility that the line may be in use at the time a train enters the detector section and the transmission of the track occupied indication code will be delayed, the provision of relay 2GC insures that the signal will not be cleared inadvertently by any prior control code issued to the same station.

Figs. 5A and 5B illustrate another method by which these results may be accomplished without the use of a selecting relay such as relay 2GC.

Referring to Fig. 5A, and assuming signal 2LB is to be cleared, as in the case hereinbefore described; upon movement of lever 2SG to the left relay 2HC is picked up over a circuit 52 generally similar to circuit 5 of Fig. 1C but including in addition, front contact a of lever 2SG and the lower winding of relay 2MK which in Fig. 1C are in circuit 48 which controls circuit 5. In Fig. 5A, relay 2HC is held energized over a stick circuit 52a when lever 2SG is released, which like circuit 5a includes the reverse contact b of relay 2MK. The signal clear code is initiated upon the closing of circuit 9 due to the release of lever 2SG as already described, and at the station, relay 2LHS of Fig. 5B becomes reversed by an impulse received over its lower winding as already explained in connection with Fig. 2C, to clear signal 2LB.

It will be apparent that any subsequent control code to the same station initiated by another lever will merely repeat the signal control impulse and will not change conditions.

When a train enters the detector track section of Fig. 2C to put the signal to stop, relays ITR and ITZ, Fig. 5B, deliver an impulse to circuit 153 to momentarily energize the upper winding of a polar stick relay ITS similar to relay TS of our prior patent above mentioned. Relay ITS reverses in response to the energization of circuit 153, and its contact *a* completes circuit 151 to restore relay 2LHS to normal and to hold it in that position, contacts *e* of relays ITR or ITZ open circuit 101 to release relay S, and contacts *f* of these relays cause resulting indication code to have a long impulse for reversing relay ITK of Fig. 1C, to display a "track occupied" indication. Relay ITZ releases and prepares a restoring circuit 154 for relay ITS but circuit 154 is held open at contact *d* of relay S until the "track occupied" code is transmitted. Until relay ITS is restored due to the reenergization of relay S at the end of the "track occupied" code, relay ITS holds circuit 151 closed thereby rendering relays 2LHS and 2RHS non-responsive to any prior control code received at the station. It will be seen that relay ITS insures that the "track occupied" indication will be stored and transmitted in the proper order even though the line is in use until after the train has vacated the detector track section.

At the office, just prior to the receipt of the "track occupied" indication, relay ITK is normal, relays 2HK and 2MK are reversed, relay 2HC is held energized over the branch of circuit 52a including contact *e* of relay ITK, and the left-hand contacts *c* and *d* of lever 2SG are closed. Upon the receipt of the "track occupied" indication, relay ITK is reversed, and on succeeding steps of the code relay 2HK is restored to normal, as shown, and relay 2MK is either restored to normal or left reversed depending upon whether or not the detector track section is vacated at the time. Circuit 52a is opened momentarily by the successive operation of contacts *e* of relays ITK and 2HK, releasing relay 2HC, Fig. 5A, causing lamp 2HE to flash.

For operation with the signals normally at stop, lever 2NS is normal as shown, and in response to the flashing of lamp 2HE the operator restores lever 2SG to normal, as in the first form of the apparatus hereinbefore described.

For operation with the signals normally at clear, lever 2SG is left reversed, with lever 2NS also reversed, and as hereinbefore described, circuit 1 is opened momentarily by the operation of contact *b* of relay 2HK, to release relay IS. Relay 2HC now picks up again and relay 2MK is held reversed over a branch 52b of circuit 52 extending over contacts *a* of lever 2NS and relay 2HK to terminal B at contact *d* of relay IS, so that the resulting control code will include an impulse which will be effective to reverse relay 2LHS, Fig. 5B or 2C, to again clear signal 2LB as required, for the reason that this code is not transmitted until after relay ITS has been restored to normal.

Referring now to Fig. 3A, this view comprises a track plan typical of track layouts in which one or more of the traffic routes include a plurality of track switches and the signals at opposite ends of certain routes are controlled by different levers. Our apparatus, like that of our prior patent hereinbefore referred to, is particularly adapted to control the switches and signals of such track layouts. Fig. 3B illustrates a modification of Fig. 1C showing the control levers for the layout of Fig. 3A, which include four switch levers 2SW, 5SW, 7SW and 9SW and three signal levers 4SG, 6SG and 8SG for the correspondingly numbered switches and signals of Fig. 3A, having circuits generally similar to those of the levers ISW and 2SG of Fig. 1C except that the route circuits 3 and 5 of that view are replaced by route circuit networks in Fig. 3B. In addition, levers 4SG and 8SG have associated therewith the call-on signal levers 4CO and 8CO for controlling signals 4RC and 8RC, respectively. The assignment of the controls and indications to particular function steps of the code is immaterial and they may be grouped in any desired manner, or additional steps may be provided so that all the functions may be controlled by a single code. The apparatus at the station of Fig. 3A is to be understood to be governed by polar switch and signal control relays such as the relays WS and HS of Fig. 2C, in the manner shown for similarly designated neutral relays in the above-mentioned Young patent, while in Fig. 3B, it is to be understood that each relay MK is controlled by the approach locking relay or relays for the associated signal, and that in addition a lock indication relay LK is provided for each switch, each relay LK being operated to the left by code when a switch locking relay for the corresponding switch, such as Young's relay ILS, is energized, and to the right when such relay becomes deenergized, and further, that an appropriate illuminated track diagram similar to that of Fig. 1C but comprising a representation of the layout of Fig. 3A is also provided.

Referring now to the control for the single switch 3W, it will be seen that relay 3WK is controlled over a branched locking circuit 55 which closes in response to the operation of lever 3SW only if the indication code last received has positioned relay 2LK to the left, indicating that switch 3W is free to be operated, and the relay NC for the signal at each end of the last-established route is picked up, indicating that these signals and their control levers are in the normal or stop position. Considering that the route from signal 4RA over switches 5W reversed and 7W normal to signal 8L, for example, has been set up, in this case the right-hand contact *d* of relay 5PR and the left-hand contact *d* of relay 7PR will be closed, these relays being controlled like relay IPR of Fig. 1C already described, and if the last train movement over the route was from right to left, contact *e* of relay 8PR will be open in which case the available branch of circuit 55 includes contacts *b* of both relays 8NC and 4NC, which relays are controlled by their respective indication relays MK and signal levers SG in the manner more fully illustrated by relay 2NC of Fig. 1C. It will be apparent that if the last train movement over the route was from left to right, or if signal 8R is at clear, it is permissible to operate switch 3W independently of conditions at the right of signal 8R, a condition which is manifested by closing right-hand contact *e* of the signal lever relay 8PR, in circuit 55.

The remaining switch levers of Fig. 3B are controlled in accordance with the required locking conditions in a generally similar manner, as will be clear from the drawings. It will be apparent that if a switch lever is operated under any condition which does not permit the closing of its locking circuit the corresponding relay WC will release without reversing relay WK, so that the switch indication lamp WE, Fig. 1C, will be caused to display a flashing indication which will persist until the lever is restored to its former position.

Assume now that the crossover 5W has been reversed in response to a control code initiated by lever 5SW and that switches 3W and 7W are normal, that the corresponding indications have been received, and that the operator moves the signal lever 4SG to the right to initiate a code for clearing signal 4RB for a train movement over the route extending to signal 8R. In response to the operation of lever 4SG, relay IS will be released, relay 4GC will become energized over a branch of circuit 48, relay 4PR will reverse and relay 4NC will release, and then relay 4HC will become energized over a route circuit 56, corresponding to circuit 5 of Fig. 1C, which may be traced in Fig. 3B from terminal B at contact e of relay 8NC, left-hand contact e of relay 7PR, contact a of relay 2WC, front contact d of relay 8NC, back contact b of relay 8RS, contact a of relay 5WC, right-hand contacts e and f of relay 5PR, contact a of relay 3WC, back contact d of relay 4NC, right-hand contacts c of relay 4PR, lever 4SG and relay 4GC through relay 4HC to terminal C. With relay 4HC energized and the right-hand contacts of relay 4PR closed, a signal clear code will be initiated upon the release of lever 4SG, for clearing signal 4RD, in a manner similar to that already described in connection with lever 2SG. The switch lever relays 3PR, 5PR and 7PR are now locked because contact b of relay 4NC is open in the circuits for the corresponding relays WK.

Assume next that the operator moves lever 8SG to the right to initiate a code for clearing signal 8R. Relay IS will release, relay 8GC will become energized, relay 8PR will close its right-hand contacts and relay 8NC will release, completing a route circuit 57 extending from terminal B at right-hand contact d of relay 8PR, back contact e of relay 8NC, left-hand contact e of relay 7PR, contact a of relay 7WC, back contact d of relay 8NC, right-hand contact c of relay 8PR, the upper winding of relay 8RS, right-hand contact c of lever 8SG, contact c of relay 8GC through relay 8HC to terminal C. Relays 8RS and 8HC pick up over circuit 57, and relay 8RS completes a stick circuit 58 from terminal B at contact f of relay 8HC, over its contact a and lower winding to terminal C, and upon the release of lever 8SG a control code will be initiated for clearing signal 8R. The energizing circuit 56 for relay 4HC is now connected to terminal B at front contact b of relay 8RS.

Fig. 3B also illustrates the control for a call-on signal such as signal 4RC or 8LC. A call-on signal lever such as 4CO is provided which controls the associated relays 4GC and IS in the same manner as the main signal lever 4SG. It is to be understood that contact c of lever 4CO is included in a branch of circuit 32, Fig. 1C, to control the character of a code impulse which governs a call-on stick relay in the field, such as the relay CHS of our prior patent or the relay 4CO of the above-mentioned Young patent. It is also to be noted that a relay PR is not required for a signal lever governing a signal for one direction only such as lever 6SG, in which case the lever contact e is included in a branch of circuit 32 and determines the character of the assigned code impulse.

In the foregoing, we have described but a few of the many possible operations of the apparatus of our invention, but since the remaining operations are carried out in a manner similar to those herein described, it is believed that they will be understood without further explanation.

Although we have herein shown and described only one form of remote control apparatus embodying our invention and two modifications thereof, it is understood that various changes and modifications may be made therein within the scope of the appended claims without departing from the spirit and scope of our invention.

Having thus described our invention, what we claim is:

1. In a remote control system, a line relay, impulsing means for intermittently energizing said line relay, a first two-position relay, a second two-position relay, circuits controlled in accordance with the position of said first two-position relay for operating said second relay from its last operated position to its other position in response to each energization of said line relay, circuits controlled in accordance with the position of said second two-position relay for operating said first relay from its last operated position to its other position in response to each deenergization of said line relay, a series of stepping relays, and circuits controlled by one of said two-position relays for operating said stepping relays one at a time in order, one for each operation of said two-position relay.

2. In a remote control system, a line relay, impulsing means for intermittently energizing said line relay, a two-position relay, a series of stepping relays; circuits controlled by said line relay independently of the condition of said stepping relays for operating said two-position relay alternately to its two positions in response to successive similar operations of said line relay, and circuits controlled by said two-position relay independently of the condition of said line relay for operating said stepping relays one at a time in order, one stepping relay being operated in response to each operation of said two-position relay.

3. In a remote control system, a line relay, means for intermittently energizing said line relay by a series of impulses, a two-position relay, a second relay, circuits controlled by said line relay for operating said two-position relay alternately to its two positions in response to successive energizations of said line relay and for maintaining said second relay energized for the duration of said series of impulses, a series of stepping relays, and circuits controlled by a front contact of said second relay and by alternately closed contacts of said two-position relay for operating said stepping relays one at a time in order, one for each impulse of said series.

4. In a remote control system, a line relay, means for intermittently energizing said line relay by a series of impulses, a first two-position relay, a second two-position relay, a checking relay, circuits including the winding of said checking relay and controlled in accordance with the position of said first two-position relay for operating said second relay from its last operated position to its other position in response to each energization of said line relay, circuits including the winding of said checking relay and controlled in accordance with the position of said second two-position relay for operating said first relay from its last operated position to its other position in response to each deenergization of said line relay, a series of stepping relays, and circuits controlled by a front contact of said checking relay and by alternately closed contacts of said first two-position relay for operating said stepping relays one at a time in order, one for each impulse of said series.

5. In a remote control system, a line relay, impulsing means for intermittently energizing said line relay, two polar relays of the magnetic stick type each arranged to be held in its last operated position when deenergized, circuits controlled by said line relay for operating said two relays alternately each to a position dependent upon the last operated position of the other, the circuits for one polar relay including back contacts and those for the other including front contacts of said line relay, a series of stepping relays, and circuits controlled by alternately closed contacts of said one polar relay for operating said stepping relays one at a time in order, one for each operation of said one relay.

6. In a remote control system, a line relay, means for intermittently energizing said line relay by a series of impulses, two polar relays of the magnetic stick type each arranged to be held in its last operated position when deenergized, a neutral checking relay, a pick-up circuit for said checking relay closed only at the beginning of a series of impulses, circuits controlled by said line relay for operating said two polar relays alternately each to a position dependent upon the last operated position of the other, the circuits for one polar relay including back contacts and those for the other including front contacts of said line relay and the circuits for both polar relays including the winding and a front contact of said checking relay, a series of stepping relays, and circuits controlled by a front contact of said checking relay and by alternately closed contacts of said one polar relay for operating said stepping relays one at a time in order, one for each operation of said one relay.

7. In combination with a line circuit supplied with a series of time spaced impulses, a two-position relay, circuits for operating said two-position relay alternately to its two positions in response to successive impulses of said series, a series of stepping relays including one for each impulse, circuits controlled by alternately closed contacts of said two-position relay for operating said stepping relays one at a time in order, one for each operation of said two-position relay, and checking means for discontinuing the operation of said stepping relays on any impulse if the operating circuit for said two-position relay fails to close in response to said impulse.

8. In combination with a line circuit supplied with a series of time spaced impulses of selected lengths arranged in accordance with a code, a two-position relay, circuits for operating said two-position relay alternately to its two positions during the intervals between the successive impulses of said code, two timing devices, one for each position of said two-position relay, circuits for operating said timing devices alternately in response to the successive impulses of said code, each to measure the length of the corresponding impulse, a series of stepping relays, and circuits controlled by said two-position relay and by one or the other of said timing devices for operating said stepping relays one at a time in order, one for each operation of said two-position relay but only if the impulses are arranged in accordance with a particular code.

9. In combination with a line circuit supplied with a series of time spaced impulses of selected lengths arranged in accordance with a code or line relay responsive to said impulses, two series of cascade connected timing relays, a two-position stick relay, circuits for momentarily energizing the first relays of said two series alternately in response to successive energization of said line relay, circuits controlled by the first relay of each series for successively and momentarily energizing the remaining timing relays of the same series one at a time provided said line relay remains energized, circuits for maintaining energized that timing relay which is energized when said line relay releases and for operating said two-position relay from its last operated position to its other position upon the release of said line relay, a series of stepping relays including one for each impulse of said series, and circuits for energizing said relays successively controlled by alternately closed contacts of said two-position relay and each including a contact of a selected timing relay so arranged that the energization of each stepping relay is made dependent upon the relative length of the corresponding impulse.

10. In combination with a line circuit supplied with a series of time spaced impulses of selected lengths arranged in accordance with a code, a line relay responsive to said impulses, two series of three cascade connected timing relays, a two-position stick relay, circuits for momentarily energizing the first relays of said two series alternately in response to successive energizations of said line relay, circuits controlled by the first relay of each series for successively and momentarily energizing the remaining timing relays of the same series one at a time provided said line relay remains energized, circuits for operating said two-position relay from its last operated position to its other position upon the release of said line relay and for holding energized that timing relay then energized, a series of stepping relays including one for each impulse of said series, and circuits for energizing said relays successively controlled by alternately closed contacts of said two-position relay, each such circuit also including a contact of that first or third timing relay which is held energized at the end of the corresponding impulse only if said impulses are arranged in accordance with a predetermined code.

11. In a remote control system, a line circuit connecting a number of stations, a code transmitter at each station each operating when initiated to deliver a code characteristic of such station to said line circuit, a starting relay at each station operable at any time and arranged to remain in its operated condition until the associated transmitter has transmitted a complete code, means controlled by each operated starting relay effective to initiate the operation of the associated transmitter provided the line circuit has been free for at least a brief time interval, a storing relay at each station, lockout means responsive to the code delivered to said line circuit and effective if the code transmitters at a plurality of said stations are initiated simultaneously to discontinue the operation of all but one, means for energizing the storing relay at each such station except at the one which completes its code, means controlled by said energized storing relays for causing the remaining transmitters which have been initiated to transmit their codes subsequently, one at a time in an order dependent upon the relative superiority of the different stations but prior to the transmission of a code from any other station at which a starting relay assumes its operated condition during the transmission of the codes from said plurality of stations.

12. In a remote control system, a line circuit connecting a plurality of stations, a code transmitter at each station each normally effective when initiated to deliver a code including one element of particular character followed by a code call comprising selecting elements characteristic of such station to said line circuit, a starting relay at each station operable at any time and arranged to remain in its operated condition until the associated transmitter has transmitted its code, a code sending relay and a storing relay at each station, means controlled by each operated starting relay effective to initiate the operation of the associated transmitter provided the line circuit has been free for at least a brief time interval, means at each station selectively responsive to said one element of particular character for energizing the code sending relay at such station, means at each station requiring the energization of the code sending relay at such station to effect the transmission of the corresponding selecting elements by the associated transmitter, lockout means governed by the selecting elements of the code delivered to said line circuit and effective if a plurality of said code transmitters are initiated simultaneously to discontinue the operation of all but the one for the station having the superior code call, means for energizing the storing relay at each such station except at the one which completed its code, means controlled by each energized storage relay for energizing the associated code sending relay upon the initiation of the next succeeding code but prior to the transmission of said one element of such code and to also cause said one element to have a different character to which the code sending relays at other stations having operated starting relays are non-responsive, to thereby prevent the transmission of a code from any such other station until after all stations at which storing relays have been energized complete their codes.

13. In a remote control system, a line circuit connecting a plurality of stations, a code sending relay at each station, a code transmitter at each station normally effective when initiated to deliver a code including one element of particular character to which the associated code sending relay is responsive followed by a code call comprising selecting elements characteristic of such station only if such code sending relay becomes energized, starting means for initiating each transmitter whenever the line circuit has been free for at least a brief time interval, lockout means governed by the selecting elements of the code delivered to the line circuit and effective if a plurality of said code transmitters are initiated simultaneously to discontinue the operation of all but the one for the station having the superior code call, the other transmitters which have been initiated remaining effective to transmit their codes subsequently one at a time in the order of code superiority, and means for causing said one element in each of such subsequently transmitted codes to have a different character to which the code sending relays at other stations are non-responsive to insure the transmission of such codes prior to the transmission of any codes from other stations.

14. In combination, a line circuit, a plurality of code transmitters each operating when initiated to deliver a different impulse code to said line circuit, means for initiating each code transmitter when no code is being delivered to said line circuit, said initiating means when operated being effective to govern the associated transmitter until said code is fully transmitted, a storage relay for each code transmitter, means effective in the event two or more code transmitters initiate different codes at the same time for discontinuing the operation of all but one in accordance with the relative superiority in code character of the impulses of the different codes and for energizing the storing relay at each station at which the operation of the transmitter is discontinued without completing its code, and means controlled by the energized storing relays at said two or more stations for so controlling the transmission of a code as to prevent any other stations from controlling the transmission of the next following code.

15. In combination with a line circuit supplied with a series of impulses of selected character arranged in accordance with a code, a series of stepping relays, a plurality of conductors, means for selectively and repeatedly energizing one or another of said conductors in accordance with the character of the successive impulses of the code, a circuit for energizing the first stepping relay at the beginning of the code, a circuit prepared by each stepping relay except the last for energizing the next relay of the series each such circuit including an adjustable connection to one or another of said conductors to render said relays operable one at a time through a cycle each by a different impulse but only if the code corresponds to the arrangement of said connections, means controlled by the last stepping relay for connecting said conductors together and for preparing a circuit for the first relay to render said relays operable through a second cycle irrespective of the character of corresponding impulses, a plurality of movable devices, and means controlled by each stepping relay during its second cycle of operation for selectively operating a different movable device in accordance with the character of the corresponding impulse.

16. In a remote control system, two stations at spaced points connected by a line circuit, a plurality of movable devices at one station, transmitting means at said one station for delivering to said line circuit a multiple impulse code including a plurality of impulses of selected character constituting a station code call followed by additional impulses of a character identifying the positions of each of said devices, receiving means at the other station selectively responsive to said code, a starting circuit at said one station controlled by each of said devices, starting means controlled by said circuit effective to initiate the operation of the associated transmitting means in response to a change in position of any of said devices, means for controlling the operation of said transmitting means independently of the condition of said starting circuit during the transmission of said station code call, and means including said starting circuit for controlling the operation of said transmitting means during the transmission of said additional impulses to prevent further transmission of said code in the event any of said devices changes its position during the transmission of said additional impulses.

17. In a remote control system, two stations at spaced points connected by a line circuit, a plurality of movable devices at one station, transmitting means at said one station for delivering to said line circuit a multiple impulse code including a plurality of impulses of selected character constituting a station code call followed by additional impulses of a character identifying the positions of each of said devices, receiving means at the other station selectively responsive to said code, a normally energized starting relay, a holding circuit for said relay comprising a starting circuit opened momentarily in response to a change in position of any of said devices, a circuit closed in response to the release of said starting relay due to the momentary opening of said starting circuit for initiating the operation of said code transmitting means, and circuits for maintaining said transmitting means in operation to complete the code effective only if said starting circuit is maintained closed during the transmission of said additional impulses.

18. In a remote control system, two stations at spaced points connected by a line circuit, a plurality of movable devices at each station, transmitting means at each station for delivering to said line circuit a multiple impulse code of a fixed number of impulses for controlling movable devices at the other station in accordance with the positions of certain movable devices at the transmitting station, a normally energized starting relay at each station effective when released to initiate the operation of the associated transmitting means, means for releasing each starting relay in response to a change in position of any one of a plurality of movable devices at the same station, manually operable means at one station effective when operated to include an additional impulse in any code transmitted from such station, and means at the other station for releasing the starting relay at such station when any received code includes such additional impulse to thereby initiate a return code even though the position of none of said movable devices at such station is changed.

19. In combination with code transmitting apparatus for transmitting different multiple impulse code signals for a control office to a remote station, a track switch and a signal for governing traffic movements over said switch located at said station, a switch lever and a signal lever at said office, means responsive to a movement of either of said levers from one control position to another to initiate the operation of said apparatus to transmit a code in which the character of selected impulses depends upon the positions of said switch and signal levers, means for determining the character of another impulse of said code dependent upon whether or not said signal lever has been operated to initiate said code, switch and signal control relays at said station selectively responsive to the character of said selected impulses for controlling the track switch and signal, respectively, and means preventing the response of said signal control relay to the corresponding signal control impulse when said another impulse is of a character indicating that said signal lever was not operated.

20. In a centralized traffic control system for railroads, a plurality of stick polar indication relays for indicating the condition of different track sections, a biased polar relay, a circuit for each indication relay including the winding of said biased polar relay, means for supplying impulses of one character or another to said circuits successively to operate said indication relays to one position or another, the impulses of said one character only also operating said biased polar relay, a neutral relay, a normally closed circuit for said neutral relay including pole-changing contacts on each of said indication relays, in series, and arranged to momentarily release said neutral relay in response to a change in position of any of said indication relays, an audible signal closed only when said biased polar relay and said neutral relay are both operated.

21. In combination with a section of railway track having a track relay, a signal for governing the movement of traffic into said section, a signal control relay having a stop and a clearing position for controlling said signal, an intermittently available communication system for manually governing said signal control relay from an office at a point remote from said section and for also transmitting indications of the condition of said track section to said office, a storing relay responsive to the release of said track relay for initiating the transmission of a track occupied indication as soon as said communication system becomes available, and means controlled by said storing relay for operating said signal control relay to its stop position and for holding it in that position until said indication has been transmitted.

22. Apparatus for the remote control of a movable device, comprising a two-position rotatable lever of the type requiring a preliminary movement in an axial direction in order to effect rotation from one position to another, a two-position relay arranged to remain in its last operated position when deenergized, a locking relay, a circuit for operating said locking relay closed upon the preliminary movement of said lever but only if conditions are favorable for the operation of said device, energizing circuits for operating said two-position relay to a position corresponding to that of said lever closed in response to the operation of said locking relay, and means rendered effective upon the release of said lever for operating said device to a position corresponding to that of said two-position relay.

23. Apparatus for the remote control of a movable device comprising a two-position rotatable lever of the type requiring a preliminary movement in an axial direction in order to effect rotation from one position to another, a two-position relay arranged to remain in its last operated position when deenergized, a locking relay, a circuit for operating said locking relay closed upon the preliminary movement of said lever but only if conditions are favorable for the operation of said device, energizing circuits for operating said two-position relay to a position corresponding to that of said lever closed in response to the operation of said locking relay, means rendered effective upon the release of said lever for operating said device to a position corresponding to that of said two-position relay, and means controlled jointly by said device and said two-position relay in corresponding positions for restoring said locking relay to its non-operated position.

24. In a remote control system, a control office and a remote station, a plurality of movable devices at said station, code transmitting means at said office for transmitting multiple impulse codes to said station for controlling each of said devices, each in accordance with the character of an assigned impulse of each such code, a plurality of two-position relays at said office each adapted to remain in its last operated position when deenergized and including one for each device, a movable lever for each two-position relay, means responsive to the movement of any lever for operating the associated two-position relay to a position corresponding to that of the operated lever, means rendered effective upon the release of the operated lever for initiating the operation of said code transmitting means, and means controlled by said transmitting means when initiated for transmitting a code in which the character of each of said assigned impulses is controlled in accordance with the position of the corresponding two-position relay.

25. Code transmitting apparatus for the remote control of a plurality of movable devices each in accordance with the character of an assigned impulse of a multiple code, comprising a plurality of movable levers, one for each device, each lever being of the type requiring a preliminary movement in an axial direction in order to effect rotation from one position to another, a two-position relay for each lever, an initiating circuit for said apparatus including a starting relay contact which closes in response to the preliminary movement of any lever and in series therewith a contact closed upon the subsequent release of such lever, circuits responsive to the rotation of any lever for operating the associated two-position relay to a position in agreement with that of the operated lever, and means responsive to the closing of said initiating circuit initiating the operation of said apparatus to transmit a code in which the character of each of said assigned impulses is in accordance with the position of the associated two-position relay.

26. Code transmitting apparatus for the remote control of a plurality of interlocked devices each in accordance with the character of an assigned impulse of a multiple impulse code, comprising a plurality of movable levers, one for each device, a two-position relay for each lever, an indication relay for each device indicating the last operated position of such device, an initiating circuit for said apparatus closed in response to an operation of any of said levers, circuits controlled by said indication relays and rendered effective upon the operation of any lever to operate the associated two-position relay to a position in agreement therewith but only if that indicated condition of the devices interlocked with the device controlled by said lever is such as to permit its operation, and means responsive to the closing of said initiating circuit to initiate the operation of said apparatus to transmit a code in which the character of each of said assigned impulses is in accordance with the position of the associated two-position relay.

CLARENCE S. SNAVELY.
ALFRED B. MILLER.
ARTHUR P. JACKEL.